(12) United States Patent
Otterstedt

(10) Patent No.: US 12,017,923 B2
(45) Date of Patent: Jun. 25, 2024

(54) METAL CONTAINING FORMULATIONS

(71) Applicant: PREBONA AB, Simrishamn (SE)

(72) Inventor: Jan-Erik Otterstedt, Simrishamn (SE)

(73) Assignee: PREBONA AB, Simrishamn (SE)

( * ) Notice: Subject to any disclaimer, the term of this patent is extended or adjusted under 35 U.S.C. 154(b) by 535 days.

(21) Appl. No.: 16/633,102

(22) PCT Filed: Jul. 23, 2018

(86) PCT No.: PCT/EP2018/069941
§ 371 (c)(1),
(2) Date: Jan. 22, 2020

(87) PCT Pub. No.: WO2019/020576
PCT Pub. Date: Jan. 31, 2019

(65) Prior Publication Data
US 2020/0231454 A1    Jul. 23, 2020

(30) Foreign Application Priority Data

Jul. 24, 2017  (EP) .................................. 17182745
Dec. 21, 2017  (EP) .................................. 17209885

(51) Int. Cl.
*C01B 33/32*    (2006.01)

(52) U.S. Cl.
CPC ........ *C01B 33/325* (2013.01); *C01P 2006/22* (2013.01)

(58) Field of Classification Search
None
See application file for complete search history.

(56) References Cited

U.S. PATENT DOCUMENTS

| | | | |
|---|---|---|---|
| 1,836,093 A * | 12/1931 | Taylor | C01B 33/325 |
| | | | 423/188 |
| 3,715,224 A | 2/1973 | Campbell | |
| 7,662,354 B2 | 2/2010 | Oki | |
| 2012/0301553 A1 | 11/2012 | Otterstedt | |

FOREIGN PATENT DOCUMENTS

| | | |
|---|---|---|
| JP | 2010273698 A | 12/2010 |
| WO | 2005014059 A1 | 2/2005 |

OTHER PUBLICATIONS

PQ, PQ Sodium Silicates, 2004, https://www.pqcorp.com/docs/default-source/recommended-literature/pq/sodium-silicate-solids/sodiumsilicates.pdf?sfvrsn=394ebc05_3 (Year: 2004).*
Suba, Iron minerals removal from different quartz sands, Procedia Earth and Planetary Science, 2015, 849-854 (Year: 2015).*
Tjandra et al., Interaction between silicates and ionic surfactants in dilute solution, Langmuir, 2006, 22, 1493-1499 (Year: 2006).*
Chen et al., Effect of sodium silicate on the solubility of zinc oxide of the Na2O—ZnO—H2O equilibrium system, Hydrometallurgy, 136, 46-50, 2013 (Year: 2013).*
International Search Report for corresponding International Application No. PCT/EP2018/069941 dated Dec. 9, 2018.
Written Opinion of the International Searching Authority for corresponding International Application No. PCT/EP2018/069941 dated Dec. 9, 2018.

* cited by examiner

*Primary Examiner* — Coris Fung
*Assistant Examiner* — Keling Zhang
(74) *Attorney, Agent, or Firm* — Renner, Otto, Boisselle & Sklar, LLP

(57) ABSTRACT

An aqueous silicate solution containing ions of metal having an atomic number selected from atomic numbers 21-31, 39-50, 57-82, and 89-93 and a process for preparing the solution. The solution is useful e.g. for forming metal containing coatings.

16 Claims, No Drawings

METAL CONTAINING FORMULATIONS

This application is a national phase of International Application No. PCT/EP2018/069941 filed Jul. 23, 2018 and published in the English language, which claims priority to European Application No. 17209885.7 filed Dec. 21, 2017, and European Application No. 17182745.4 filed Jul. 24, 2017, all of which are hereby incorporated herein by reference.

FIELD OF THE INVENTION

The present invention relates to metal containing formulations. More particularly, the invention relates to metal containing silicate solutions. It also relates to methods for preparing such formulations and the use of such formulations in different applications where biocidal, catalytic or other advantageous effects are desired.

BACKGROUND AND PRIOR ART

Nanotechnologies are the science and business of manipulating matter at the atomic scale. Materials produced with the aid of various kinds of nanotechnologies are used in many areas of everyday life, such as cosmetics, clothing fabrics, sports equipment, paints, packaging, food, etc. and have been used for some time as, for instance, catalysts in many important industrial processes. In the future we will no doubt see many more application of nanomaterials in general and of nanomaterials involving metals in particular.

It is well known that many transition metals, for instance iron, cobolt, nickel, molybdenum, gadolinium, copper, silver, chromium and zinc, have catalytic, magnetic and biocidal properties, but there is need for new forms of these metals that combine high catalytic, magnetic, and biocidal activity with both excellent non-leachability and perfect dispersion of ions.

However, there still is a need for forms (or formulations) of metal ions, e.g. multivalent metal ion, of various advantageous properties.

SUMMARY OF THE INVENTION

A first aspect is an aqueous silicate solution containing ions of a metal having an atomic number selected from atomic numbers 21-31, 39-50, 57-82, and 89-93.

A further aspect is a process for preparing an aqueous silicate solution containing ions of a metal having an atomic number selected from atomic numbers 21-31, 39-50, 57-82, and 89-93, by admixing a aqueous solution of the silicate and an aqueous solution of a water soluble salt of said metal.

The solutions of the invention may be used for the formulations of metal containing products, for instance paints and sealants, as well as coating compositions and coatings obtained by such compositions.

DETAILED DESCRIPTION OF THE INVENTION

Any ppm or percent value given herein to express the amount or concentration of a substance in a mixture (e.g. a solution) is calculated as a ratio of the mass of the substance in the mixture to the total mass of the mixture, unless otherwise indicated or apparent from the context. Thus, for example, in 1 g of a solution containing 1000 ppm (parts per million) $Ag^+$, the amount of $Ag^+$ is $10^{-3}$ g.

It is well known that if pH of a metal salt solution, such as transition metal salt solution, is raised to above 8 or 9 the corresponding hydroxide will generally precipitate. It is therefore surprising that metals, such as transition metals, can exist in relatively high concentrations, for instance 1000 to 2000 ppm in the materials of the present invention, many of which have pH higher than 9 or even higher than 10, without precipitating. The silicate solutions used according to the present invention, on the other hand, are generally highly alkaline, e.g. the pH of commercial alkali silicate solutions ranges from about 10 to 13, and at lower pH, the silicate will polymerize and form a gel. Since e.g. alkali silicate solutions are stable only at alkaline pH it is preferable to prepare the formulations of this invention in the region of pH>10.

It has now surprisingly been found that destabilization in the form of flocculation or gelling of aqueous solutions of metals, such as transition metals, at a pH normally leading to flocculation of the metal, can be prevented by admixing silicate solutions with the metal solutions. Thus, a stable metal containing silicate solution is obtainable according to the present invention. The term stable used in the present invention means that the formulation should be stable toward gelling and that there is no substantial precipitation of solid content, mainly metal species, characterised by that no more than 50%, preferably no more than 20%, and more preferably no more than 10% by weight of the solid material has precipitated and settled as a sludge at the bottom, for a time of at least 1 hour, e.g. at least 2 hours, at least 6 hours, at least 12 hours, preferably for a time of at least 24 hours, after the preparation of the formulation. The formulation should be stored properly, e.g. protected from light and under otherwise correct storage conditions.

Surprisingly, stability as defined herein is achieved without the need for addition of a chelate complexing agent (or chelating agent, or complexing agent), such as EDTA or DETA and/or without the need for reacting the metal with any such agent before admixing with the silicate solution. Thus the solution provided herein does not require the presence of any chelate complexing agent. In a preferred embodiment, therefore, the solution is free from chelate complexing agent, i.e. it contains no compound capable of binding any of the metal ions in a chelate complex, or contains only trace amounts of such compounds. If, however, a chelating or complexing agent is present, the molar amount of any such agent is substantially lower than the molar amount of the ions of metal present in the solution. For example, if the formulation of the invention contains a chelating or complexing agent, such agent is present in a molar ratio to the metal ions of less than 1:100, or less than 1:50, or less than 1:20, or less than 1:10, or less than 1:5. Preferably, however, the solution contains no chelating or complexing agent. Further, if the solution contains more than one chelate complex forming agent, the total amount thereof is such that the molar ratio of said agents to the total amount of metal ions present in solution preferably is less than 1:100, or less than 1:50, or less than 1:20, or less than 1:10, or less than 1:5.

The Silicates

The silicate solutions used according to the present invention are "non-true solutions" or "colloidal solutions". Depending on e.g. the silicate concentration, at least a portion of the silicate is not dissolved on a molecular level but may form oligomers of different size.

The silicate used according to the invention may be e.g. an alkali silicate or a quaternary ammonium silicate. In some embodiments, the silicate of the invention is an alkali silicate. In some other embodiments, the silicate is a quaternary ammonium silicate.

In some embodiments, the silicate is a quaternary ammonium silicate containing ammonium ions of the type $R_4N^+$ wherein each R is independently selected aliphatic or aromatic groups, e.g. C1-C6 alkyl groups or phenyl, optionally carrying other functional groups, such as hydroxyl functions. For example, in some embodiments, the quaternary ammonium silicate is a tetraalkyl ammonium silicate, wherein the alkyl groups e.g. may contain from 1 to 6 carbon atoms, or from 1 to 3 carbon atoms, e.g. the alkyl groups may be methyl groups. A quaternary ammonium silicate useful according to the invention may be prepared as described in U.S. Pat. No. 9,695,111, the teachings of which are incorporated herein by reference.

Commercial solutions of silicates also are a convenient source of the soluble silicates of the present invention. For example, in some embodiments, the silicate solution a commercially available alkali silicate solution, such as sold by e.g. PQ Corporation (www.pqcorp.com).

In alkali silicate solutions, the key variables are the alkali metal, generally lithium (Li), sodium (Na) or potassium (K); the ratio of $SiO_2$ to alkali metal oxide in the silicate, and the concentration of the silicate in the solution.

The ratio of $SiO_2$ to alkali metal oxide ($SiO_2/M_2O$) may be expressed as a weight ratio or molar ratio. In the case of sodium silicate the two ratios are nearly the same. Thus a weight ratio of a sodium silicate is transformed to the mole ratio by the multiplication factor 1.03; for potassium silicate the weight ratio is multiplied by the factor 1.57 to give the mole ratio. For lithium silicate the factor is 0.50.

For sodium silicates, the $SiO_2/Na_2O$ weight ratio ranges from about 1.6 to about 4.

The $SiO_2/K_2O$ ratio of potassium silicates varies from about 1.5 to about 2.5 on a weight basis, which corresponds to a ratio of from 2.3 to 3.8 on a molar basis.

The $SiO_2/Li_2O$ ratio of lithium silicates varies from about 6.0 to about 20.0 on a weight basis, which corresponds to a ratio of from about 3.0 to about 10.0 on a molar basis.

Table 1 shows the properties of some typical commercial alkali silicate solutions During the development of concentrated silica sols stabilized with NaOH it was realized that in the $SiO_2/Na_2O$ ratio range of about 4:1 to 25:1 the concentrated compositions were generally unstable, and eventually gelled. When a 3.25 ratio sodium silicate solution was added to a concentrated silica sol to reduce the $SiO_2/Na_2O$ ratio from 100:1 to 5:1, for example, a gel immediately formed. However, it was discovered that by aging or warming the gel, a stable solution was again formed. Thus silicate solutions having $SiO_2/Na_2O$ weight ratios of from 4.2:1 to 6:1 containing 10-30% $SiO_2$ could be prepared from silica sols originally containing 5-25 nm particles.

If instead a 3.25 ($SiO_2/K_2O$) molar ratio potassium silicate is added to an alkali-stabilized, concentrated silica sol, gelling does not occur. Thus, stable mixtures of colloidal silica and potassium silicate can be prepared with a silica concentration of 15-30 wt. % and $SiO_2/K_2O$ molar ratios of 11:1 to 24:1.

Similarly, stable mixtures of colloidal silica and lithium silicate can be prepared with a silica concentration of 15-30 wt. % and $SiO_2/Li_2O$ molar ratios of 4:1 to 25:1.

Alkali silicate solutions generally contain both silicate ions and colloidal polymeric (including oligomeric) silicate species, formed by polymerization of the monomeric $SO_4^{4-}$ unit to form siloxane (Si—O—Si) bonds. The polymeric species, which may be linear or cyclic, are not of uniform size. The degree of polymerization generally increases with increasing $SiO_2/Me_2O$ ratio and with increasing concentration of the silicate.

Generally, the term "silicate solution" as used herein refers to a liquid phase containing polymeric (including oligomeric) silicate species, although it should be realized that some of the silicate may also be present as dissolved non-polymeric species.

In some embodiments, therefore, the formulation according to the invention contains sodium silicate having a $SiO_2/Na_2O$ molar ratio of about 6:1 to about 2:1, at a $SiO_2$ concentration of about 2% by weight to about 30% by weight, based on the total weight of the formulation.

In some embodiments, the formulation according to the invention contains potassium silicate having a $SiO_2/K_2O$ molar ratio of about 2:1 to about 25:1 at a $SiO_2$ concentration

TABLE 1

Typical commercial alkali silicate solutions and their properties

| Silicates | Weight ratio $SiO_2/M_2O$ | Molar ratio $SiO_2/M_2O$ | $M_2O$ % by weight | $SiO_2$ % by weight | Baumé 20° C. | Specific gravity $d^{20}_{20}$ | Viscosity 20° C., P | pH |
|---|---|---|---|---|---|---|---|---|
| Sodium silicates | 1.60 | 1.65 | 19.7 | 31.5 | 58.5 | 1.68 | 70 | 12.8 |
| | 2.00 | 2.06 | 18.0 | 36.0 | 59.3 | 1.69 | 700 | 12.2 |
| | 2.50 | 2.58 | 10.6 | 26.5 | 42.0 | 1.41 | 0.6 | 11.7 |
| | 2.88 | 2.97 | 11.0 | 31.7 | 47.0 | 1.49 | 9.6 | 11.5 |
| | 3.22 | 3.32 | 8.9 | 28.7 | 41.0 | 1.39 | 1.8 | 11.3 |
| | 3.75 | 3.86 | 6.8 | 25.3 | 35.0 | 1.32 | 2.2 | 10.8 |
| Potassium silicates | 1.80 | 2.83 | 16.4 | 29.5 | 47.7 | 1.49 | 13.0 | 12.1 |
| | 2.10 | 3.30 | 12.5 | 26.3 | 40.0 | 1.31 | 10.5 | 11.7 |
| | 2.20 | 3.45 | 9.05 | 19.9 | 30.0 | 1.26 | 0.07 | 11.5 |
| | 2.50 | 3.93 | 8.3 | 20.8 | 29.8 | 1.26 | 0.4 | 11.3 |
| Lithium silicates | 9.4 | 4.7 | 2.2 | 20.7 | — | 1.17 | — | 10.7 |
| | 9.6 | 4.8 | 2.2 | 20.7 | — | — | 4 | 11.0 |
| | 11.8 | 5.9 | 1.6 | 18.8 | — | 1.18 | — | — |
| | 17.6 | 8.5 | 1.2 | 20.0 | — | — | 2.5 | 11.0 |

In Table 1, the density of the silicate solution is indicated in degrees Baumé (Be) and as the specific gravity $d^{20}_{20}$. The approximate relationship between the two values is given by the equation: $d^{20}_{20}=145/(145-Be)$.

of about 2 by weight to about 30% by weight, based on the total weight of the formulation.

In some embodiments, the formulation according to the invention contains lithium silicate in a $SiO_2/Li_2O$ molar ratio of about 2:1 to about 25:1 at a $SiO_2$ concentration of about 2% by weight to about 30% by weight, based on the total weight of the formulation.

In some further embodiments, the formulation according to the invention contains a more than one type of silicate, e.g. more than one type of quaternary ammonium silicate, or more than one type of alkali silicate, or a mixture thereof. For example, in some embodiments, the formulation contains lithium silicate and at least one other type of silicate, selected from sodium silicate and potassium silicate. In some embodiments, the formulation contains sodium silicate and at least one other type of silicate, selected from lithium silicate and potassium silicate. In some embodiments, the formulation contains potassium silicate and at least one other type of silicate, selected from lithium silicate and sodium silicate.

In some embodiments, the formulation contains lithium silicate and sodium silicate. In some other embodiments, the formulation contains lithium silicate and potassium silicate. In some other embodiments, the formulation contains sodium silicate and potassium silicate.

The Metal

The metal used according to the present invention essentially is a metal capable of forming multivalent cations, although also monovalent metal cations are contemplated as useful according to the invention. In some embodiments, the metal is one which may exist in more than one oxidation state, e.g. Cu or Fe. In some embodiments, the metal is one capable of forming multivalent metal ions only, e.g. divalent or trivalent metal ions only. In some embodiments, the metal is one capable of forming divalent metal ions only. In some embodiments, the metal is one capable of forming trivalent metal ions only. In some embodiments, the metal is capable of forming monovalent metal ions. In some embodiments, the metal is capable of forming tetravalent metal ions.

Generally, with reference to the Periodic table of elements, the metal used according to the present invention is found in any one of the periods 4, 5 and 6 and groups IIIB, IVB, VB, VIB, VIIB, VIIIB, IB, IIB or IIIA (i.e. atomic numbers 21-31, 39-49 and 57-81); or in any of the periods 5 and 6 and group IVA (i.e. atomic numbers 50 and 82), or in period 7 and group IIIB (i.e. atomic numbers 89-103).

The elements with atomic numbers 21-31 are (by atomic number-atomic symbol-atomic name): 21-Sc-Scandium; 22-Ti-Titanium; 23-V-Vanadium; 24-Cr-Chromium; 25-Mn-Manganese; 26-Fe-Iron; 27-Co-Cobalt; 28-Ni-Nickel; 29-Cu-Copper; 30-Zn-Zinc; and 31-Ga-Gallium.

The elements with atomic numbers 39-50 are (by atomic number-atomic symbol-atomic name): 39-Y-Yttrium; 40-Zr-Zirconium; 41-Nb-Niobium; 42-Mo-Molybdenum; 43-Tc-Technetium; 44-Ru-Ruthenium; 45-Rh-Rhodium; 46-Pd-Palladium; 47-Ag-Silver; 48-Cd-Cadmium; 49-In-Indium; and 50-Sn-Tin.

The elements with atomic numbers 57-82 are (by atomic number-atomic symbol-atomic name): 57-La-Lanthanum; 58-Ce-Cerium; 59-Pr-Praseodymium; 60-Nd-Neodymium; 61-Pm-Promethium; 62-Sm-Samarium; 63-Eu-Europium; 64-Gd-Gadolinium; 65-Tb-Terbium; 66-Dy-Dysprosium; 67-Ho-Holmium; 68-Er-Erbium; 69-Tm-Thulium; 70-Yb-Ytterbium; 71-Lu-Lutetium; 72-Hf-Hafnium; 73-Ta-Tantalum; 74-W-Tungsten; 75-Re-Rhenium; 76-Os-Osmium; 77-Ir-Iridium; 78-Pt-Platinum; 79-Au-Gold; 80-Hg-Mercury; 81-Tl-Thallium; and 82-Pb-Lead.

The elements with atomic numbers 89-103 are (by atomic number-atomic symbol-atomic name): 89-Ac-Actinium; 90-Th-Thorium; 91-Pa-Protactinium; 92-U-Uranium; 93-Np-Neptunium; 94-Pu-Plutonium; 95-Am-Americium; 96-Cm-Curium; 97-Bk-Berkelium; 98-Cf-Californium; 99-Es-Einsteinium; 100-Fm-Fermium; 101-Md-Mendelevium; 102-No-Nobelium; and 103-Lr-Lawrencium.

In some embodiments, the metal used according to the present invention is found in any one of the periods 4, 5 and 6 and groups IIIB, IVB, VB, VIB, VIIB, VIIIB, IB, IIB or IIIA (i.e. atomic numbers 21-31, 39-49 and 57-81); or in any of the periods 5 and 6 and group IVA (i.e. atomic numbers 50 and 82).

In some embodiments, the metal used according to the present invention is found in any one of the periods 4, 5 and 6 and groups IIIB, IVB, VB, VIB, VIIB, VIIIB, IB, IIB, or IIIA (i.e. atomic numbers 21-31, 39-49 and 57-81).

In some embodiments, the metal used according to the present invention is found in any one of the periods 4 and 5 and groups IIIB, IVB, VB, VIB, VIIB, VIIIB, IB, IIB or IIIA (i.e. atomic numbers 21-31 and 39-49, or in period 5 and group IVA (i.e. atomic number 50).

In some embodiments, the metal used according to the present invention is found in any one of the periods 5 and 6 and groups IIIB, IVB, VB, VIB, VIIB, VIIIB, IB, IIB, IIIA or IVA (i.e. atomic numbers 39-50 and 57-80). In some of these embodiments, the metal used according to the invention is one that has an atomic number of from 39 to 48 or from 57 to 80.

In some embodiments, the metal used according to the present invention is selected from period 4 and groups IIIB, IVB, VB, VIB, VIIB, VIIIB, IB, IIB or IIIA (i.e. atomic numbers 21-31).

In some embodiments, the metal used according to the present invention is selected from period 5 and groups IIIB, IVB, VB, VIB, VIIB, VIIIB, IB, IIB, IIIA or IVA (i.e. atomic numbers 39-50).

In some embodiments, the metal used according to the present invention is selected from period 6 and groups IIIB, IVB, VB, VIB, VIIB, VIIIB, IB, IIB, IIIA or IVA (i.e. atomic numbers 57-82).

When the metal used according to the present invention is one found in period 4, said metal is selected from Sc, Ti, V, Cr, Mn, Fe, Co, Ni, Cu, Zn and Ga. In some embodiments, a metal selected from period 4 more particularly is selected from Ti, V, Cr, Mn, Fe, Co, Ni, Cu, and Zn; more particularly from Cr, Mn, Fe, Co, Ni, Cu, and Zn. In some embodiments, a metal selected from period 4 more particularly is selected from Cr, Fe, Co, Cu, and Zn. In some embodiments, a metal selected from period 4 more particularly is selected from Cr, Mn, Fe, Co, Cu, and Zn. In some embodiments, a metal selected from period 4 more particularly is selected from Fe, Co, Cu, and Zn. In some embodiments, a metal selected from period 4 more particularly is selected from Fe, Co, and Cu. In some embodiments, a metal selected from period 4 more particularly is selected from Co, Cu and Zn. In some embodiments, a metal selected from period 4 more particularly is selected from Cu and Zn. In some embodiments, a metal selected from period 4 more particularly is Cu. In some embodiments, a metal selected from period 4 more particularly is Zn. In some embodiments, a metal selected from period 4 more particularly is Fe. In some embodiments, a metal selected from period 4 more particularly is Cr. In some embodiments, a metal selected from period 4 more particularly is Mn.

When the metal used according to the present invention is one of period 5, said metal is selected from Y, Zr, Nb, Mo, Tc, Ru, Rh, Pd, Ag, Cd, In and Sn. In some embodiments, a metal selected from period 5 more particularly is selected from Zr, Nb, Mo, Tc, Ru, Rh, Pd, Ag, Cd, In and Sn. In some embodiments, a metal selected from period 5 more particularly is selected from Ru, Rh, Pd, Ag, Cd, In and Sn; or from Ru, Rh, Pd, Ag, In and Sn, e.g. Ag, In and Sn, or Ag and Sn. In some embodiments, a metal selected from period 5 more particularly is Sn. In some other embodiments, a metal selected from period 5 more particularly is Ag. In some other embodiments, a metal selected from period 5 is not Ag. In some further embodiments, a metal selected from period 5 more particularly is In.

When the metal used according to the present invention is one of period 6, said metal is selected from the lanthanide series (metals of atomic number 57-71) as well as from metals of atomic number 72-82. In some embodiments, a metal from period 6, more particularly is a metal from the lanthanides series. In some embodiments, when the metal is selected from the lanthanide series, it more particularly is Gd.

In some embodiments, a metal selected from period 6 is one of atomic number 72-82. In some embodiments, when the metal is one of atomic number 72-82, it more particularly is one of atomic number 72-80, e.g. or one of atomic number 72-79. In some embodiments, when the meal is of atomic number 72-82, it more particularly is Pb.

In some embodiments, the metal used according to the present invention is selected from periods 4, 5 and 6 and groups VIB, VIIB, VIIIB, IB, IIB, and IIIA and from periods 5 and 6 and group IVA.

In some embodiments, the metal used according to the present invention is selected from periods 4, 5 and 6 and groups VIB, VIIB, VIIIB, IB, IIB, and IIIA.

In some embodiments, the metal used according to the present invention is selected from periods 4, 5 and 6 and groups VIB, VIIB, VIIIB, IB, and IIB.

In some embodiments, the metal used according to the present invention is selected from periods 4, 5 and 6 and group VIB, e.g. from periods 4 and 5 and group VIB.

In some embodiments, the metal used according to the present invention is selected from periods 4, 5 and 6 and group VIIB, e.g. from periods 4 and 5 and group VIIB.

In some embodiments, the metal used according to the present invention is selected from periods 4, 5 and 6 and group VIIIB, e.g. from periods 4 and 5 and group VIIIB.

In some embodiments, the metal used according to the present invention is selected from periods 4, 5 and 6 and group IB. In some embodiments, when the metal is selected from group IB, it is Ag.

In some embodiments, the metal used according to the present invention is selected from periods 4, 5 and 6 and group IIB.

In some embodiments, the metal used according to the present invention is selected from periods 5 and 6 and group IVA.

In some embodiments, the metal used according to the present invention is selected from Cr, Mn, Fe, Co, Cu, Zn, Ag, Sn, Gd and Pb.

A multivalent cation according to the present invention is one having a charge z which is higher than 1. Examples of multivalent cations according to the present invention are $Cr^{3+}$, $Fe^{2+}$, $Fe^{3+}$, $Mn^{2+}$, $Co^{2+}$, $Cu^{2+}$, $Zn^{2+}$, $Ag^{+}$, $Sn^{2+}$, $Pb^{2+}$, and $Gd^{3+}$.

Finally, in some embodiments, the metal used according to the present invention is selected from period 7 and group IIIB, i.e. it belongs to the actinide series (atomic number 89-103, e.g. Ac, Th, Pa and U).

For the purpose of the present invention, any metal (cation), e.g. a monovalent or multivalent (e.g. divalent or trivalent) metal (cation), or transition metal (cation) referred to herein shall be understood as included in scope of the invention, unless otherwise specified or apparent from the context.

According to the IUPAC definition, followed herein, a transition metal is an element whose atom has a partially filled d sub-shell, or which can give rise to cations with an incomplete d sub-shell. The present invention also includes the actininides and the lanthanides as well as heavy metals (e.g. lead, Pb) within its scope, as well as some semi-metals, such as arsenic (As).

In some embodiments, the metal used herein is a transition metal. In some embodiment, the metal used herein is a transition metal capable of forming divalent or trivalent cations. In some embodiments, the metal used herein is a lanthanide metal. In some embodiments, the metal used herein is a lanthanide metal capable of forming divalent or trivalent cations.

The liquid vehicle or carrier of the formulation generally is water or an aqueous solution optionally containing one or more further solvents and one or further solutes, e.g. one or more further components selected from surfactants, thickeners, etc.

The Formulation of the Invention

The formulation of the invention is an aqueous solution containing monovalent or multivalent cations of one or more metals and one or more types of silicate as described herein.

In some embodiments, the formulation contains more than one of the metals as defined herein above, e.g. two or more different metals, e.g. 2 or more different transition metals.

Generally, the metal is present in the formulation in an amount of from 1 to 5000 ppm (all ppm values are by weight) of the formulation, e.g. from 10 to 5000 ppm. In some embodiments, the metal is present in an amount of from 10 to 4000 ppm, e.g. from 10 to 3500 ppm, from 10 to 3000 ppm, from 10 to 2500 ppm, from 10 to 2000 ppm, from 10 to 1500 ppm, from 10 to 1000 ppm, from 10 to 800 ppm, or from 10 to 700 ppm, or from 10 to 500 ppm.

In some other embodiments, the metal is present in the formulation in an amount of from 100 to 5000 ppm, from 100 to 4000 ppm, e.g. from 100 to 3500 ppm, from 100 to 3000 ppm, from 100 to 2500 ppm, from 100 to 2000 ppm, from 100 to 1500 ppm, from 100 to 1000 ppm, from 100 to 800 ppm, or from 100 to 500 ppm.

In some other embodiments, the metal is present in the formulation in an amount of from 200 to 5000 ppm, from 200 to 4000 ppm, e.g. from 200 to 3500 ppm, from 200 to 3000 ppm, from 200 to 2500 ppm, from 200 to 2000 ppm, from 200 to 1500 ppm, from 200 to 1000 ppm, from 200 to 800 ppm.

In some other embodiments, the metal is present in the formulation in an amount of from 300 to 5000 ppm, from 300 to 4000 ppm, e.g. from 300 to 3500 ppm, from 300 to 3000 ppm, from 300 to 2500 ppm, from 300 to 2000 ppm, from 300 to 1500 ppm, from 300 to 1000 ppm, from 300 to 800 ppm.

In some other embodiments, the metal is present in the formulation in an amount of from 400 to 5000 ppm, from 400 to 4000 ppm, e.g. from 400 to 3500 ppm, from 400 to 3000 ppm, from 400 to 2500 ppm, from 400 to 2000 ppm, from 400 to 1500 ppm, from 400 to 1000 ppm, from 400 to 800 ppm.

In some other embodiments, the metal is present in the formulation in an amount of from 500 to 5000 ppm, from 500 to 4000 ppm, e.g. from 500 to 3500 ppm, from 500 to 3000 ppm, from 500 to 2500 ppm, from 500 to 2000 ppm, from 500 to 1500 ppm, from 500 to 1000 ppm, or from 500 to 800 ppm.

In some of these embodiments, the formulation according to the invention contains sodium silicate having a $SiO_2/Na_2O$ molar ratio of about 6:1 to about 2:1, e.g. of about 5:1 to about 2:1, such as about 4.5:1 to about 2.5:1, in an amount corresponding to a $SiO_2$ concentration of about 1% by weight to about 30% by weight, or about 2% by weight to about 25% by weight, or about 3% to about 20% by weight, or about 4% to about 15%, based on the total weight of the formulation.

In some embodiments, the formulation according to the invention contains potassium silicate having a $SiO_2/K_2O$ molar ratio of about 25:1 to about 2:1, e.g. about 10:1 to about 2:1, or about 5:1 to about 2:1, in an amount corresponding to a $SiO_2$ concentration of about 1% by weight to about 30% by weight, or about 2% by weight to about 25% by weight, or about 3% to about 20% by weight, or about 4% to about 15%, based on the total weight of the formulation.

In some embodiments, the formulation according to the invention contains lithium silicate in a $SiO_2/Li_2O$ molar ratio of about 25:1 to about 2:1, e.g. about 10:1 to about 2:1, or about 5:1 to about 2:1, in an amount corresponding to a $SiO_2$ concentration of about 1% by weight to about 30% by weight, or about 2% by weight to about 25% by weight, or about 3% to about 20% by weight, or about 4% to about 15%, based on the total weight of the formulation.

For example, in some embodiments, the formulation is a solution containing ions of one or more metals, as defined herein above, and one or more alkali silicates, each alkali silicate having a molar ratio of silicon dioxide to alkali oxide ($SiO_2:Me_2O$) of from 25:1 to 2:1, e.g. from 6:1 to 2:1, e.g. from 5:1 to 2:1, or from 4.5:1 to 2:1, e.g. from 4.5:1 to 2.5:1, or from 4.5:1 to 3:1, or from 4:1 to 3:1, wherein the metal(s) is/are present at a concentration of from 10 to 5000 ppm, e.g. from 100 to 5000 ppm, from 200 to 4000 ppm, or from 200 to 3500 ppm, e.g. from 200 to 3000 ppm, or from 200 to 2500 ppm, or from 200 to 2000 ppm, e.g. from 200 to 1500 ppm, by weight of the formulation, and the one or more alkali silicates are present in a total amount corresponding to a concentration of $SiO_2$ of about 1 to about 30%, e.g. about 2 to about 25%, or about 3 to about 20%, or about 4 to about 15%, by weight of the formulation.

In some embodiments, the formulation is a solution containing ions of a metal, as defined herein above, e.g. of a transition metal, and an alkali silicate, selected from lithium silicate, sodium silicate and potassium silicate, having a molar ratio of silicon dioxide to alkali oxide ($SiO_2:Me_2O$) of from 25:1 to 2:1, e.g. from 6:1 to 2:1, e.g. from 5:1 to 2:1, or from 4.5:1 to 2:1, e.g. from 4.5:1 to 2.5:1, or from 4.5:1 to 3:1, or from 4:1 to 3:1, wherein the metal is present at a concentration of from 10 to 5000 ppm, e.g. from 100 to 5000 ppm, from 200 to 4000 ppm, or from 200 to 3500 ppm, e.g. from 200 to 3000 ppm, or from 200 to 2500 ppm, or from 200 to 2000 ppm, e.g. from 200 to 1500 ppm, by weight of the formulation, and the alkali silicate is present in a total amount corresponding to a concentration of $SiO_2$ of about 1 to about 30%, e.g. about 2 to about 25%, or about 3 to about 20%, or about 4 to about 15%, by weight of the formulation.

In some embodiments, the formulation is a solution containing from 20 to 5000 ppm, e.g. from 50 to 5000 ppm, from 100 to 4000 ppm, or from 200 to 3500 ppm, e.g. from 300 to 3000 ppm, or from 400 to 2500 ppm, or from 500 to 2000 ppm, e.g. from 600 to 1500 ppm, by weight of the formulation, of metal ion, and an alkali silicate having a molar ratio of silicon dioxide to alkali oxide ($SiO_2:Me_2O$) of from 15:1 to 2:1, e.g. from 6:1 to 2:1, e.g. from 5:1 to 2:1, or from 4.5:1 to 2:1, e.g. from 4.5:1 to 2.5:1, or from 4.5:1 to 3:1, or from 4:1 to 3:1, at a concentration corresponding to a concentration of $SiO_2$ of about 1 to about 30%, e.g. about 2 to about 25%, or about 3 to about 20%, or about 4 to about 15%, by weight of the formulation.

In some embodiments, the formulation is a solution containing from 100 to 5000 ppm, or from 200 to 3500 ppm, e.g. from 200 to 3000 ppm, or from 200 to 2500 ppm, or from 200 to 2000 ppm, e.g. from 200 to 1500 ppm by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 1 to about 30%, by weight of the formulation.

In some embodiments, the formulation is a solution containing from 100 to 5000 ppm, by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 1 to about 30%, by weight of the formulation. In some embodiments, the formulation is a solution containing from 100 to 4000 ppm, by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 1 to about 30%, by weight of the formulation.

In some embodiments, the formulation is a solution containing from 100 to 3500 ppm, by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 2 to about 20%, by weight of the formulation.

In some embodiments, the formulation is a solution containing from 100 from 100 to 3000 ppm, by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 1 to about 30%, by weight of the formulation.

In some embodiments, the formulation is a solution containing from 100 to 2500 ppm, by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 1 to about 30%, by weight of the formulation.

In some embodiments, the formulation is a solution containing from 100 to 2000 ppm, by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 1 to about 30%, by weight of the formulation.

In some embodiments, the formulation is a solution containing from 100 to 1500 ppm, by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 1 to about 30%, by weight of the formulation.

In some embodiments, the formulation is a solution containing from 100 to 1000 ppm, by weight of the formulation of metal ion, and an alkali silicate having a molar ratio of silicon dioxide to alkali oxide ($SiO_2:Me_2O$) of from 5:1 to 2:1, at a concentration corresponding to a concentration of $SiO_2$ of about 1 to about 30%, by weight of the formulation.

In some embodiments, the formulation is a solution containing from 300 to 5000 ppm, e.g. from 300 to 4000 ppm, or from 400 to 3000 pmm, or from 500 to 2500 ppm, by weight of the formulation, of metal ion and an alkali silicate having a molar ratio of silicon dioxide to alkali oxide ($SiO_2$:$Me_2O$) of from 5:1 to 2:1, at a concentration corresponding to a concentration of $SiO_2$ of about 1 to about 30%, by weight of the formulation.

In some of these embodiments, the molar ratio of silicon dioxide to alkali oxide ($SiO_2$:$Me_2O$) is from 4.5:1 to 2:1.

In some further of these embodiments, the molar ratio of silicon dioxide to alkali oxide ($SiO_2$:$Me_2O$) is from 5:1 to 2.5:1.

In some further of these embodiments, the molar ratio of silicon dioxide to alkali oxide ($SiO_2$:$Me_2O$) is from 4.5:1 to 2.5:1.

In some further of these embodiments, the molar ratio of silicon dioxide to alkali oxide ($SiO_2$:$Me_2O$) is from 5:1 to 3:1.

In some further of these embodiments, the molar ratio of silicon dioxide to alkali oxide ($SiO_2$:$Me_2O$) is from 4.5:1 to 3:1.

In some embodiments, the formulation is a mixture of from 100 to 5000 ppm by weight of the formulation of metal ion; and an alkali silicate solution having a molar ratio of silicon dioxide to alkali oxide ($SiO_2$:$Me_2O$) of from 5:1 to 2:1, the alkali silicate being present in an amount corresponding to a $SiO_2$ concentration of about 1% by weight to about 30% by weight, or about 2% by weight to about 25% by weight, or about 3% to about 20% by weight, or about 4% to about 15%, or about 5% to about 10%, based on the total weight of the formulation.

The "metal" in the inventive formulation as mentioned herein above is as defined herein, but does not include an alkali metal, e.g. the alkali metal inherently present in the alkali silicate.

In some embodiments, the formulation contains one or more surfactants, selected from non-ionic, amphoteric (or zwitterionic), anionic surfactants, cationic surfactants, silicon surfactants, fluorinated surfactants, and polymeric surfactants. In some embodiments, the surfactant is nonionic. For example, in some embodiments, the formulation contains from 0.01 to 5% of a surfactant or mixture of surfactants, e.g. from 0.02 to 2%, or from 0.05 to 1%, e.g. from 0.1% to 0.5%, by weight of the formulation.

The formulations according to the present invention are prepared by a mixing a solution of a silicate with a solution comprising metal ions, e.g. transition metals ions or ions of any of the metals mentioned herein above. Due care has to be taken concerning concentration of reactants and products, e.g. using water of good quality, preferably deionized water, observing proper rate of addition and order of addition of the components, working in conservative but realistic temperature ranges and providing sufficient agitation and stirring.

Concentrations of silica used in the various preparations of the present invention vary from one (1) weight % $SiO_2$ or less to undiluted solutions of commercial alkali silicates that could contain 25 weight % $SiO_2$ or more, e.g. from 5% by weight to 20% by weight.

In some embodiments, the formulation is a lithium silicate solution containing metal ions at a concentration of at least 10 ppm, more preferably at least 100 ppm, or at least 200 ppm, and up to 5000 ppm, e.g. up to 4500 ppm, up to 4000 ppm, up to 3500 ppm, up to 3000 ppm, e.g. up to 2500 ppm, up to 2000 ppm, up to 1800 ppm, up to 1500 ppm, up to 1000 ppm, up to 800 ppm, up to 700 ppm, or up to 500 ppm, by total weight of the solution, and lithium silicate having a $SiO_2$:$Li_2O$ molar ratio of from about 6:1 to about 2:1, e.g. from about 5:1 to about 3:1, from about 4:5 to about 3:1, or from about 4:1 to about 3:1, e.g. from about 3.5:1 to about 3:1, at a concentration of at least 2%, or at least 3%, e.g. at least 4%, or at least 5% and at most 25%, or at most 20%, or at most 18%, or at most 16%, or at most 10%, or at most 8%, by total weight of the solution.

In some embodiments, the formulation is a sodium silicate solution containing metal ions at a concentration of at least 10 ppm, more preferably at least 100 ppm, or at least 200 ppm, and up to 5000 ppm, e.g. up to 4500 ppm, up to 4000 ppm, up to 3500 ppm, up to 3000 ppm, e.g. up to 2500 ppm, up to 2000 ppm, up to 1800 ppm, up to 1500 ppm, up to 1000 ppm, up to 800 ppm, up to 700 ppm, or up to 500 ppm, by total weight of the solution, and sodium silicate having a $SiO_2$:$Na_2O$ molar ratio of from about 6:1 to about 2:1, e.g. from about 5:1 to about 3:1, from about 4:5 to about 3:1, or from about 4:1 to about 3:1, e.g. from about 3.5:1 to about 3:1, at a concentration of at least 2%, or at least 3%, e.g. at least 4%, or at least 5% and at most 25%, or at most 20%, or at most 18%, or at most 16%, or at most 10%, or at most 8%, by total weight of the solution.

In some embodiments, the formulation is a potassium silicate solution containing metal ions at a concentration of at least 10 ppm, more preferably at least 100 ppm, or at least 200 ppm, and up to 5000 ppm, e.g. up to 4500 ppm, up to 4000 ppm, up to 3500 ppm, up to 3000 ppm, e.g. up to 2500 ppm, up to 2000 ppm, up to 1800 ppm, up to 1500 ppm, up to 1000 ppm, up to 800 ppm, up to 700 ppm, or up to 500 ppm, by total weight of the solution, and potassium silicate having a $SiO_2$:$K_2O$ molar ratio of from about 6:1 to about 2:1, e.g. from about 5:1 to about 3:1, from about 4:5 to about 3:1, or from about 4:1 to about 3:1, e.g. from about 3.5:1 to about 3:1, at a concentration of at least 2%, or at least 3%, e.g. at least 4%, or at least 5% and at most 25%, or at most 20%, or at most 18%, or at most 16%, or at most 10%, or at most 8%, by total weight of the solution.

The metal ions are cations of any one or more of the metals mention herein. In some embodiments, the metal ions are cations of any one or more metals selected from Cr, Gd, Zn, Fe, Co, Mn, Pb, Sn, Cu, and Ag; e.g. from Zn, Fe, Sn, Cu, and Ag. In some embodiments, the metal is Cr. In some embodiments, the metal is Gd. In some embodiments, the metal is Zn. In some embodiments, the metal is Fe. In some embodiments, the metal is Co. In some embodiments, the metal is Mn. In some embodiments, the metal is Pb. In some embodiments, the metal is Sn. In some embodiments, the metal is Cu. In some embodiments, the metal is Ag.

The Process for Preparing the Formulation of the Invention

Provided herein is also a process for preparing an aqueous alkali silicate solution containing ions of a metal having an atomic number selected from atomic numbers 21-31, 39-50, 57-82, and 89-93, which comprises admixing a aqueous solution of the silicate and an aqueous solution of a water soluble salt of said metal. A surprising feature of the process described herein resides in the fact that the process does not involve the use of a complexing or chelating agent. Thus, in the process of the present invention, the metal as defined herein above does not need to be reacted with a complexing or chelating agent before admixing with the aqueous solution of the silicate. Therefore, preferably, the formulation is prepared with an aqueous solution of a water soluble salt of said metal that is free from a complexing agent for the metal ion; the method of the invention does not comprise reacting the metal cation with a complexing agent.

Most soluble metal salts can be used to prepare the materials of the present invention. Some stock solutions containing 9000 ppm by weight of some representative metals, used in illustrative examples of compositions of the invention, are shown in Table 2.

TABLE 2

Stock solutions containing 9000 ppm of metal

| Metal | Salt | Molar mass (g) | pH | Appearance/comments |
|---|---|---|---|---|
| Ag | AgNO$_3$ | 169.87 | 6.5 | Some haze |
| Cu | CuCl$_2$•2H$_2$O | 170.48 | 4.1 | Clear, blue |
| Cr | CrCl$_3$•6H$_2$O | 266.45 | 2.6 | Clear, dark blue |
| Fe | FeCl$_3$•6H$_2$O | 270.30 | 1.6 | Clear, orange |
| Co | CoCl$_2$•6H$_2$O | 237.93 | 5.8 | Clear, light red |
| Pb | Pb(C$_2$H$_3$O$_2$)$_2$•3H$_2$O | 379.33 | 6.0 | Some sludge. Clear supernatant |
| Sn | SnCl$_2$•2H$_2$O | 225.65 | 1.5 | Some sludge. Clear yellow supernatant |
| Zn | Zn(C$_2$H$_3$O$_2$)$_2$•2H$_2$O | 219.51 | 5.8 | Clear |
| Gd | Gd(NO$_3$)$_3$•6H$_2$O | 460.36 | 3.5 | Clear |
| Mn | C$_4$H$_6$MnO$_4$•4H$_2$O | 245.09 | 6.9 | Clear |

As mentioned herein above, the stability of solutions of transition metals in water towards gelling and flocculation is quite sensitive to pH. If pH is raised a few units above the natural pH of the solution gelling and/or flocculation will occur. For most solutions of transition metals it requires the addition of a few, 3-5, drops of 1 m NaOH before flocs can be seen in the solutions (the sample size was typically 50 g. A drop from a plastic pipette typically weighed 0.025 g). The exact value of pH at which flocculation occurs depends on the type and concentration of transition metal in the solution; see Tables 3a-i.

In Tables 3a-i, a "critical flocculation pH" was estimated by adding one drop of 1 M NaOH at a time by a plastic pipette to 20 g of transition metal solutions of different concentrations in the range from about 20 ppm to about 600 ppm by weight and noting the pH at which the first indication of flocculation could be seen.

TABLE 3a

Critical pH of CuCl$_2$ solutions of different concentrations

| Ex. | Conc. ppm | Initial pH | # drops of 1M NaOH at first floc | pH at first floc | Appearance/comments |
|---|---|---|---|---|---|
| 1 | 26 | 5.0 | 6 | 11.0 | Floc after 15 minutes |
| 2 | 77 | 5.6 | 6 | 8.8 | Floc |
| 3 | 129 | 5.9 | 5 | 7.0 | Hazy. Floc after 2 hours |
| 4 | 286 | 6.0 | 5 | 5.6 | Hazy. Floc after 2 hours |

TABLE 3b

Critical pH of FeCl$_3$ solutions of different concentrations

| Ex. | Conc. ppm | Initial pH | # drops of 1M NaOH at first floc | pH at first floc | Appearance/comments |
|---|---|---|---|---|---|
| 1 | 26 | 3.7 | 14 | 11.9 | Faint yellow. Floc after 4 days |
| 2 | 77 | 3.4 | 13 | 11.6 | Faint yellow. Floc after 4 days |
| 3 | 129 | 3.2 | 11 | 5.9 | Yellow-orange. Cloudy. Floc after 4 days |
| 4 | 286 | 2.8 | 19 | 5.8 | Yellow-orange. Cloudy. Floc after 4 days |

TABLE 3c

Critical pH of CrCl$_3$ solutions of different concentrations

| Ex. | Conc. ppm | Initial pH | # drops of 1M NaOH at first floc | pH at first floc | Appearance/comments |
|---|---|---|---|---|---|
| 1 | 26 | 5.7 | 7 | 11.5 | Clear. Some floc after 11 days |
| 2 | 77 | 4.5 | 6 | 7.8 | Hazy. Floc after 11 days |
| 3 | 129 | 4.0 | 18 | 11.2 | Hazy. Floc after 11 days |
| 4 | 286 | 3.6 | 19 | 5.6 | Hazy. Floc |

TABLE 3d

Critical pH of CoCl$_2$ solutions of different concentrations

| Ex. | Conc. ppm | Initial pH | # drops of 1M NaOH at first floc | pH at first floc | Appearance/comments |
|---|---|---|---|---|---|
| 1 | 26 | 7.7 | 7 | 10.9 | Floc |
| 2 | 77 | 7.6 | 3 | 8.5 | Floc |
| 3 | 129 | 7.6 | 4 | 8.1 | Floc |
| 4 | 286 | 7.6 | 2 | 7.5 | Floc |

TABLE 3e

Critical pH of GdNO$_3$ solutions of different concentrations

| Ex. | Conc. ppm | Initial pH | # drops of 1M NaOH at first floc | pH at first floc | Appearance/comments |
|---|---|---|---|---|---|
| 1 | 26 | 7.3 | 4 | 10.9 | Clear. Some floc after 7 days |
| 2 | 77 | 7.0 | 3 | 8.8 | Floc |
| 3 | 129 | 6.8 | 4 | 7.9 | Floc |
| 4 | 286 | 7.0 | 9 | 7.2 | Floc |

TABLE 3f

Critical pH of Mn(C$_2$H$_3$O$_2$)$_2$ solutions of different concentrations

| Ex. | Conc. ppm | Initial pH | # drops of 1M NaOH at first floc | pH at first floc | Appearance/comments |
|---|---|---|---|---|---|
| 1 | 26 | 6.8 | 2 | 7.2 | Floc |
| 2 | 77 | 7.5 | 2 | 7.7 | Floc |
| 3 | 129 | 7.7 | 2 | 7.8 | Floc |
| 4 | 286 | 8.0 | 2 | 7.9 | Floc |

TABLE 3g

Critical pH of Zn(C$_2$H$_3$O$_2$)$_2$ solutions of different concentrations

| Ex. | Conc. ppm | Initial pH | # drops of 1M NaOH at first floc | pH at first floc | Appearance/comments |
|---|---|---|---|---|---|
| 1 | 26 | 7.0 | 9 | 11.2 | Floc |
| 2 | 77 | 7.2 | 6 | 8.1 | Floc |
| 3 | 129 | 7.1 | 6 | 8.8 | Floc |
| 4 | 286 | 7.0 | 4 | 6.9 | Floc |

TABLE 3h

Critical pH of Pb(C₂H₃O₂)₂ solutions of different concentrations

| Ex. | Conc. ppm | Initial pH | # drops of 1M NaOH at first floc | pH at first floc | Appearance/ comments |
|---|---|---|---|---|---|
| 1 | 26 | 7.2 | 4 | 10.5 | Floc |
| 2 | 77 | 7.3 | 4 | 10.5 | Floc |
| 3 | 129 | 7.0 | 2 | 9.3 | Floc |
| 4 | 286 | 7.0 | 4 | 10.5 | Floc |

Tables 3a to 3h illustrates that the aqueous solubility of many metal hydroxides, e.g. of transition metals, is very low and that the critical pH in most cases rapidly decreases as the concentration of metal ion is increased.

Tables 4a to 4g further illustrate that at a high pH, e.g. pH 10.5, aqueous solutions of transition metals will floc even at quite low metal concentrations.

TABLE 4a

Effect of pH on the stability of aqueous solutions of $CuCl_2$ at different concentrations of $Cu^{2+}$

| Ex. | Concentration ppm | pH before adjustment | # drops of 1M NaOH | pH after adjustment | Appearance after pH adjustment |
|---|---|---|---|---|---|
| 1 | 26 (90) | 5.7 | 5 | 11.1 | Floc |
| 2 | 77 (270) | 5.8 | 11 | 11.0 | Floc |
| 3 | 129 (450) | 5.7 | 17 | 10.9 | Floc |
| 4 | 286 (1000) | 5.5 | 24 | 10.8 | Floc |
| 5 | 571 (2000) | 4.8 | 35 | 10.5 | Floc |

TABLE 4b

Effect of pH on the stability of aqueous solutions of $FeCl_3$ at different concentrations of $Fe^{3+}$

| Ex. | Concentration ppm | pH before adjustment | # drops of 1M NaOH | pH after adjustment | Appearance after pH adjustment |
|---|---|---|---|---|---|
| 1 | 26 (90) | 2.6 | 8 | 10.5 | Floc |
| 2 | 77 (270) | 2.4 | 11 | 11.0 | Floc |
| 3 | 129 (450) | 2.6 | 10 | 10.7 | Floc |
| 4 | 286 (1000) | 2.3 | 33 | 10.6 | Floc |
| 5 | 571 (2000) | 2.7 | 35 | 10.5 | Floc |

TABLE 4c

Effect of pH on the stability of aqueous solutions of $CrCl_3$ at different concentrations of $Cr^{3+}$

| Ex. | Concentration ppm | pH before adjustment | # drops of 1M NaOH | pH after adjustment | Appearance after pH adjustment |
|---|---|---|---|---|---|
| 1 | 26 (90) | 4.3 | 10 | 11.2 | Floc |
| 2 | 77 (270) | 4.2 | 11 | 11.5 | Floc |
| 3 | 129 (450) | 4.1 | 16 | 11.0 | Floc |
| 4 | 286 (1000) | 3.0 | 70 | 11.5 | Floc |
| 5 | 571 (2000) | 3.2 | 66 | 10.5 | Floc |

TABLE 4d

Effect of pH on the stability of aqueous solutions of $CoCl_2$ at different concentrations of $Co^{2+}$

| Ex. | Concentration ppm | pH before adjustment | # drops of 1M NaOH | pH after adjustment | Appearance after pH adjustment |
|---|---|---|---|---|---|
| 1 | 26 (90) | 6.5 | 5 | 11.0 | Floc |
| 2 | 77 (270) | 8.3 | 10 | 11.0 | Floc |
| 3 | 129 (450) | 8.4 | 17 | 10.7 | Floc |
| 4 | 286 (1000) | 7.3 | 34 | 10.8 | Floc |
| 5 | 571 (2000) | 7.7 | 40 | 10.7 | Floc |

TABLE 4e

Effect of pH on the stability of aqueous solutions of $GdNO_3$ at different concentrations of $Gd^{3+}$

| Ex. | Concentration ppm | pH before adjustment | # drops of 1M NaOH | pH after adjustment | Appearance after pH adjustment |
|---|---|---|---|---|---|
| 1 | 26 (90) | 6.2 | 5 | 11.5 | Floc |
| 2 | 77 (270) | 6.7 | 5 | 11.0 | Floc |
| 3 | 129 (450) | 6.9 | 6 | 10.9 | Floc |
| 4 | 286 (1000) | 6.6 | 22 | 11.3 | Floc |
| 5 | 571 (2000) | 6.9 | 25 | 11.5 | Floc |

TABLE 4f

Effect of pH on the stability of aqueous solutions of $Zn(C_2H_3O_2)_2$ at different concentrations of $Zn^{2+}$

| Ex. | Conc. ppm | pH before adjustment | # drops of 1M NaOH | pH after adjustment | Appearance after pH adjustment |
|---|---|---|---|---|---|
| 1 | 26 (90) | 8.0 | 5 | 11.1 | Floc |
| 2 | 77 (270) | 7.2 | 11 | 11.0 | Floc |
| 3 | 129 (450) | 6.8 | 17 | 10.9 | Floc |
| 4 | 286 (1000) | 6.8 | 24 | 10.8 | Floc |
| 5 | 571 (2000) | 6.9 | 35 | 10.5 | Floc |

TABLE 4g

Effect of pH on the stability of aqueous solutions of $Pb(C_2H_3O_2)_2$ at different concentrations of $Pb^{2+}$

| Ex. | Conc. ppm | pH before adjustment | # drops of 1M NaOH | pH after adjustment | Appearance after pH adjustment |
|---|---|---|---|---|---|
| 1 | 26 (90) | 7.5 | 8 | 11.0 | Floc |
| 2 | 77 (270) | 7.3 | 11 | 11.0 | Floc |
| 3 | 129 (450) | 7.1 | 17 | 10.9 | Floc |
| 4 | 286 (1000) | 6.7 | 23 | 10.8 | Floc |
| 5 | 571 (2000) | 7.1 | 29 | 10.7 | Floc |

The solutions of the invention may be used as coatings on substrates, for treatments of continuous or discontinuous surfaces. Therefore, in some aspects, coatings prepared by applying a composition according to the present invention are provided. Coatings according to the invention may have many different functions, in particular depending on the metal that is present therein. For example, if the metal is a transition metal, a coating may be provided having one or more of the advantageous features provided by the transition metal, e.g. magnetic properties. The coating may be applied to any solid material, e.g. plastic, resin, metal, wood, concrete, glass, brick, stone, asphalt, textile etc.

In some embodiments, a coating composition is provided comprising a solution as described herein and at least one further ingredient, such as a binder, a thickener, a plasticizer, a pigment, an adhesion promoter, a solvent, etc.

For example, in some embodiments, the coating composition e.g. a paint, a lacquer etc, comprises from 0.1% to 99.9% of the solution of the invention, e.g. from 1% to 99%, from 5% to 95%, from 10% to 90%, from 15% to 85%, from 20% to 80%, from 25% to 75%, by weight of the composition, and one or more further ingredients as mentioned herein above.

The invention will be better understood by reference to the following non-limiting examples.

EXAMPLES

In the Examples, use was made of either commercially available alkali silicate solutions, e.g. alkali silicate solutions having a $SiO_2$:$Me_2O$ molar ratio of 3.3, or of alkali silicate solutions prepared as follows:

4.3 Ratio, 15% by Weight $SiO_2$, Na Silicate Solution.

1 part of a 7 nm silica sol, Bindzil®30/360, diluted to 9.6 weight % $SiO_2$, was mixed with 2 parts of 3.3 molar ratio sodium silicate diluted to 17.6 weight % $SiO_2$, under magnetic stirring. The milky white dispersion of silica gel was heated to 96° C. under magnetic stirring over a period of 60 minutes. At about 85° C. the dispersion started to become clear. At 96° C., after 60 minutes, the dispersion was water clear and the heater was turned off. The pH was 11.6 at 20° C.

4.3 Ratio, 15% by Weight $SiO_2$, K Silicate Solution.

1 part of 7 nm silica sol, Bindzil® 30/360, diluted to 10.7 weight % $SiO_2$, was mixed with 2.31 parts of 3.3 molar ratio potassium silicate diluted to 16.8 weight % $SiO_2$ under magnetic stirring. The dispersion was heated to 96° C. under magnetic stirring over a period of 60 minutes when the heater was turned off. The pH was 11.6 at 20° C.

4.3 Ratio, 15% by Weight $SiO_2$, Li Silicate Solution.

220 g Bindzil® 30/360 decationized with a strong cation exchange resin in the hydrogen form, pH 2.0, were mixed with 204 g 2 M LiOH (pH 13.1) under stirring by a magnet bar at 20° C. The stirring was continued and after 12 hours the opaque watery gel had cleared and thinned to a water clear solution of pH 11.2.

2.5 Ratio 24.1% $SiO_2$ Na Silicate Solution

A solution of 2.5 $SiO_2$:$Na_2O$ molar ratio sodium silicate was prepared by adding 7.23 g NaOH dissolved in 15 g deionized water (8.14 M NaOH) to 180 g of 3.3 $SiO_2$:$Na_2O$ molar ratio, 27.0% $SiO_2$, sodium silicate solution under stirring by a magnet bar. The mixture was heated to 96° C. over a period of 4 hours, and was kept at 96° C. for 30 minutes. The heater was turned off and the mixture was allowed to cool to room temperature under moderate agitation over night. The solution contained 24.1% $SiO_2$, and had a pH of 12.3.

Alkali silicate solutions: 3.3 molar ratio Na silicate ("Na 3.3"), 10% $SiO_2$, 2.5 molar ratio Na silicate ("Na 2.5"), 10% $SiO_2$, 3.3 molar ratio K silicate ("K 3.3"), 10% $SiO_2$ and 3.3 molar ratio Li silicate ("Li 3.3"), 10% $SiO_2$.

Example 1

An aqueous solution containing 1000 ppm by weight of $Cr^{3+}$ was prepared by dissolving 0.512 g $CrCl_3$ in sufficient deionized water to obtain 100 g of $Cr^{3+}$ solution. Under vigorous stirring using a bar magnet, 5 g of the $Cr^{3+}$ solution was added to 5 g of a solution of 3.3 $SiO_2$:$Li_2O$ molar ratio lithium silicate containing 10% $SiO_2$, to obtain Example 1.1. The appearance of the formulation was observed at the end of the admixing.

Examples 1.2 to 1.5 were prepared following the same general procedure as used to prepare Example 1.1, but varying the concentration of either one or both of the solutions and/or the relative amounts of the solutions admixed. For each formulation the appearance was noted after admixing. Details of the formulations and the results are shown in Table 5.

TABLE 5

Mixtures of 3.3 molar ratio Li silicate ("Li 3.3") solutions with $CrCl_3$ solutions

| Ex. | Formulation | $SiO_2$ % | Metal ppm | Ratio silicate soln. to metal soln. | Appearance |
|---|---|---|---|---|---|
| 1.1 | Li 3.3 10% + Cr 1000 ppm | 5 | 500 | 1:1 | Clear/green |
| 1.2 | Li 3.3 10% + Cr 1000 ppm | 6.7 | 333 | 2:1 | Clear/green |
| 1.3 | Li 3.3 10% + Cr 1000 ppm | 3.3 | 667 | 1:2 | Somewhat hazy |
| 1.4 | Li 3.3 10% + Cr 3000 ppm | 5 | 1500 | 1:1 | Somewhat hazy |
| 1.5 | Li 3.3 20% + Cr 3000 ppm | 10 | 1500 | 1:1 | Somewhat hazy |

[1]pH of a 3000 ppm $CrCl_3$ solution is 3.2

Examples 2 to 11

Examples 2 to 11 (Ex. 2.1 through 11.4) were prepared following the same general procedure as in Example 1, using different metal salts and the 3.3 molar ratio lithium silicate, at varying amounts of metal and silicate. For each formulation the appearance was noted after admixing. Details of the formulations and the results are shown in Tables 6 to 15.

TABLE 6

Mixtures of 3.3 molar ratio Li silicate ("Li 3.3") solutions with $GdCl_3$ solutions

| Ex. | Formulation | $SiO_2$ % | Metal ppm | Ratio silicate soln. to metal soln. | Appearance |
|---|---|---|---|---|---|
| 2.1 | Li 3.3 10% + Gd 1000 ppm[1] | 5 | 500 | 1:1 | Clear/colourless |
| 2.2 | Li 3.3 10% + Gd 1000 ppm | 3.3 | 667 | 1:2 | Clear/colourless |
| 2.3 | Li 3.3 10% + Gd 1000 ppm | 2.5 | 750 | 1:3 | Clear/colourless |
| 2.4 | Li 3.3 10% + Gd 1000 ppm | 6.7 | 333 | 2:1 | Clear/colourless |

[1]pH of a 3000 ppm $GdCl_3$ solution is 7.8

TABLE 7

Mixtures of 3.3 molar ratio Li silicate ("Li 3.3") solutions with $ZnCl_2$ solutions

| Ex. | Formulation | $SiO_2$ % | Metal ppm | Ratio silicate soln. to metal soln. | Appearance |
|---|---|---|---|---|---|
| 3.1 | Li 3.3 20% + Zn 3000 ppm[1] | 10 | 1500 | 1:1 | Clear/colourless |
| 3.2 | Li 3.3 20% + Zn 3000 ppm | 6.7 | 2000 | 1:2 | Slight precipitation |

TABLE 7-continued

Mixtures of 3.3 molar ratio Li silicate ("Li 3.3") solutions with ZnCl$_2$ solutions

| Ex. | Formulation | SiO$_2$ % | Metal ppm | Ratio silicate soln. to metal soln. | Appearance |
|---|---|---|---|---|---|
| 3.3 | Li 3.3 20% + Zn 3000 ppm | 5 | 2250 | 1:3 | Precipitation |
| 3.4 | Li 3.3 20% + Zn 3000 ppm | 13.3 | 1000 | 2:1 | Clear/colourless |
| 3.5 | Li 3.3 10% + Zn 3000 ppm | 5 | 1500 | 1:1 | Slight haze |
| 3.6 | Li 3.3 10% + Zn 3000 ppm | 3.3 | 2000 | 1:2 | Slight precipitation |

[1] pH of a 3000 ppm ZnCl$_2$ solution is 6.3

TABLE 8

Mixtures of 3.3 molar ratio Li silicate ("Li 3.3") solutions with FeCl$_3$ solutions

| Ex. | Formulation | SiO$_2$ % | Metal Ppm | Ratio silicate soln. to metal soln. | Appearance |
|---|---|---|---|---|---|
| 4.1 | Li 3.3 20% + Fe 3000 ppm[1] | 13.3 | 1000 | 2:1 | Gel/sludge |
| 4.2 | Li 3.3 20% + Fe 3000 ppm[1] | 10 | 1500 | 1:1 | Gel/sludge |
| 4.3 | Li 3.3 10% + Fe 3000 ppm | 5 | 1500 | 1:1 | Gel/sludge |
| 4.4 | Li 3.3 10% + Fe 3000 ppm | 7.5 | 750 | 3:1 | Gel/sludge |
| 4.5 | Li 3.3 10% + Fe 1000 ppm | 5 | 500 | 1:1 | Clear/yellow |
| 4.6 | Li 3.3 10% + Fe 1000 ppm | 2.5 | 750 | 1:3 | Slight haze |

[1] pH of a 3000 ppm FeCl$_3$ solution is 2.

TABLE 9

Mixtures of 3.3 molar ratio Li silicate ("Li 3.3") solutions with CoCl$_2$ solutions

| Ex. | Formulation | SiO$_2$ % | Metal Ppm | Ratio of silicate to metal solution | Appearance |
|---|---|---|---|---|---|
| 5.1 | Li 3.3 20% + Co 3000 ppm[1] | 10 | 1500 | 1:1 | Clear/violet |
| 5.2 | Li 3.3 20% + Co 3000 ppm | 6.7 | 2000 | 1:2 | Slight haze |
| 5.3 | Li 3.3 20% + Co 3000 ppm | 13 | 1000 | 2:1 | Clear/violet |
| 5.4 | Li 3.3 10% + Co 3000 ppm | 5 | 1500 | 1:1 | Clear/violet |
| 5.5 | Li 3.3 10% + Co 3000 ppm | 3.3 | 2000 | 1:2 | Clear/violet |
| 5.6 | Li 3.3 20% + Co 3000 ppm | 10 | 1500 | 1:1 | Clear/violet |

[1] pH of a 3000 ppm CoCl$_2$ solution is 5.1.

TABLE 10

Mixtures of 3.3 molar ratio Li silicate ("Li 3.3") solutions with MnCl$_2$ solutions

| Ex. | Formulation | SiO$_2$ % | Metal Ppm | Ratio silicate soln. to metal soln. | Appearance |
|---|---|---|---|---|---|
| 6.1 | Li 3.3 10% + Mn 3000 ppm[1] | 5 | 1500 | 1:1 | Clear/light brown |
| 6.2 | Li 3.3 10% + Mn 3000 ppm | 3.3 | 2000 | 1:2 | Clear/light brown |
| 6.3 | Li 3.3 10% + Mn 3000 ppm | 6.7 | 1000 | 2:1 | Clear/light brown |
| 6.4 | Li 3.3 20% + Mn 3000 ppm | 10 | 1500 | 1:1 | Clear/light brown |
| 6.5 | Li 3.3 20% + Mn 3000 ppm | 6.7 | 2000 | 1:2 | Clear/light brown |
| 6.6 | Li 3.3 10% + Mn 3000 ppm | 5 | 1500 | 1:1 | Clear/light brown |

[1] pH of a 3000 ppm MnCl$_2$ solution is 6.9

TABLE 11

Mixtures of 3.3 molar ratio Li silicate ("Li 3.3") solutions with Pb(C$_2$H$_3$O$_2$)$_2$ solutions

| Ex. | Formulation | SiO$_2$ % | Metal Ppm | Ratio silicate soln. to metal soln. | Appearance |
|---|---|---|---|---|---|
| 7.1 | Li 3.3 20% + Pb 3000 ppm[1] | 10 | 1500 | 1:1 | Clear/colourless |
| 7.2 | Li 3.3 20% + Pb 3000 ppm | 13 | 1000 | 2:1 | Clear/colourless |
| 7.3 | Li 3.3 20% + Pb 3000 ppm | 8 | 1800 | 2:3 | Clear/colourless |
| 7.4 | Li 3.3 10% + Pb 3000 ppm | 5 | 1500 | 1:1 | Clear/colourless |
| 7.5 | Li 3.3 10% + Pb 3000 ppm | 3.3 | 2000 | 1:2 | Clear/colourless |

[1] pH of a 3000 ppm Pb(C$_2$H$_3$O$_2$)$_2$ solution is 5.6

TABLE 12

Mixtures of 3.3 molar ratio Li silicate ("Li 3.3") solutions with SnCl$_2$ solutions

| Ex. | Formulation | SiO$_2$ % | Metal ppm | Ratio silicate soln. to metal soln. | Appearance |
|---|---|---|---|---|---|
| 8.1 | Li 3.3 10% + Sn 532 ppm | 5 | 266 | 1:1 | Gel and haze |
| 8.2 | Li 3.3 10% + Sn 532 ppm | 8 | 106 | 4:1 | Clear, colorless |
| 8.3 | Li 3.3 10% + Sn 532 ppm | 2 | 426 | 1:4 | Clear, colorless |

[1] pH of a 532 ppm SnCl$_2$ solution is 0.73

TABLE 13

Mixtures of 3.3 molar ratio Li silicate ("Li 3.3") solutions with CuSO4 solutions

| Ex. | Formulation | SiO2 % | Metal ppm | Ratio silicate soln. to metal soln. | Appearance |
|---|---|---|---|---|---|
| 9.1 | Li 3.3 10% + Cu 3000 ppm | 5 | 1500 | 1:1 | Turbid, precipitation |
| 9.2 | Li 3.3 10% + Cu 3000 ppm | 8 | 600 | 4:1 | Slight haze, blue |
| 9.3 | Li 3.3 10% + Cu 1000 ppm | 5 | 500 | 1:1 | Clear, blue |

[1]pH of 3000 ppm CuSO4 solution is 4.6

TABLE 14

Mixtures of 3.3 molar ratio Li silicate solutions with AgNO3 solutions

| Ex. | Formulation | SiO2 % | Metal ppm | Ratio silicate soln. to metal soln. | Appearance |
|---|---|---|---|---|---|
| 10.1 | Li 3.3 20% + Ag 3000 ppm | 10 | 1500 | 1:1 | Clear, colorless |
| 10.2 | Li 3.3 20% + Ag 3000 ppm | 13 | 1000 | 2:1 | Clear, colorless |
| 10.3 | Li 3.3 20% + Ag 3000 ppm | 15 | 750 | 3:1 | Clear, colorless |
| 10.4 | Li 3.3 20% + Ag 3000 ppm | 16 | 600 | 4:1 | Clear, colorless |
| 10.5 | Li 3.3 10% + Ag 1000 ppm | 5 | 500 | 1:1 | Clear, colorless |

[1]pH of 3000 ppm AgNO3 solution is 7.7

TABLE 15

Mixtures of 3.3 molar ratio Li silicate solutions with FeCl3 solutions

| Ex. | Formulation | SiO2 % | Metal ppm | Ratio silicate soln. to metal soln. | Appearance |
|---|---|---|---|---|---|
| 11.1 | Li 3.3 10% + Fe 5143 ppm | 8 | 1029 | 4:1 | Clear/light gray |
| 11.2 | Li 3.3 10% + Fe 3000 ppm | 5 | 1500 | 1:1 | Clear/light gray |
| 11.3 | Li 3.3 10% + Fe 3000 ppm | 2 | 2400 | 1:4 | Clear/colourless |
| 11.4 | L 3.3 10% + Fe 3000 ppm | 8 | 600 | 4:1 | Clear/light gray |

Example 12

An aqueous solution containing 3000 ppm by weight of $Ag^+$ was prepared by dissolving 0.472 g AgNO3 in sufficient deionized water to obtain 100 g of $Ag^+$ solution. Under vigorous stirring using a bar magnet, 5 g of the $Ag^+$ solution was added to 5 g of a solution of 3.3 $SiO_2$:$Na_2O$ molar ratio sodium silicate containing 10% $SiO_2$, to obtain Example 12.1. The appearance of the formulation was observed at the end of the admixing.

Examples 12.2 to 12.7 were prepared following the same general procedure as used to prepare Example 12.1, but varying the concentration of either one or both of the solutions and/or the relative amounts of the solutions admixed. For each formulation the appearance was noted after admixing. Details of the formulations and the results are shown in Table 16.

TABLE 16

Mixtures of 3.3 molar ratio Na silicate ("Na 3.3") solutions with AgNO3 solutions

| Ex. | Formulation | SiO2 % | Metal ppm | Ratio silicate soln. to metal soln. | Appearance |
|---|---|---|---|---|---|
| 12.1 | Na 3.3 10% + Ag 3000 ppm | 5 | 1500 | 1:1 | Clear/yellow |
| 12.2 | Na 3.3 10% + Ag 3000 ppm | 3.3 | 2000 | 1:2 | Clear/yellow |
| 12.3 | Na 3.3 15% + Ag 5040 ppm | 7.5 | 2520 | 1:1 | Clear/yellow |
| 12.4 | Na 3.3 15% + Ag 5040 ppm | 5 | 3360 | 1:2 | Clear/yellow |
| 12.5 | Na 3.3 27% + Ag 5040 ppm | 13.5 | 2520 | 1:1 | Clear/colourless |
| 12.6 | Na 3.3 27% + Ag 5040 ppm | 5.4 | 4032 | 1:4 | Clear/yellow |
| 12.7 | Na 3.3 27% + Ag 5040 ppm | 10.8 | 3024 | 2:3 | Clear/yellow |

Examples 13 to 16

Examples 13 to 16 (Ex. 13.1 through 16.3) were prepared following the same general procedure as in Example 12, using different metal salts and the 3.3 molar ratio sodium silicate, at varying amounts of metal and silicate. For each formulation the appearance was noted after admixing. Details of the formulations and the results are shown in Tables 17 to 20.

TABLE 17

Mixtures of 3.3 molar ratio Na silicate ("Na 3.3") solutions with CuSO4 solutions

| Ex. | Formulation | SiO2 % | Metal ppm | Ratio silicate soln. to metal soln. | Appearance |
|---|---|---|---|---|---|
| 13.1 | Na 3.3 10% + Cu 3000 ppm | 5 | 1500 | 1:1 | precipitation |
| 13.2 | Na 3.3 10% + Cu 3000 ppm | 6.7 | 1000 | 2:1 | Clear/blue |
| 13.3 | Na 3.3 10% + Cu 3000 ppm | 8 | 600 | 4:1 | Clear/blue |
| 13.4 | Na 3.3 10% + Cu 1000 ppm | 5 | 500 | 1:1 | Clear/blue |
| 13.5 | Na 3.3 10% + Cu 1000 ppm | 3.3 | 667 | 1:2 | Clear/blue |
| 13.6 | Na 3.3 10% + Cu 3000 ppm | 2 | 800 | 1:4 | Slight haze |

TABLE 18

Mixtures of 3.3 molar ratio Na silicate ("Na 3.3") solutions with FeCl3 solutions

| Ex. | Formulation | SiO2 % | Metal ppm | Ratio silicate soln. to metal soln. | Appearance |
|---|---|---|---|---|---|
| 14.1 | Na 3.3 10% + Fe 3000 ppm | 6.7 | 1000 | 2:1 | sludge |
| 14.2 | Na 3.3 10% + Fe 3000 ppm | 8 | 600 | 4:1 | sludge |
| 14.3 | Na 3.3 10% + Fe 1000 ppm | 5 | 500 | 1:1 | Clear/light yellow |
| 14.4 | Na 3.3 10% + Fe 1000 ppm | 3.3 | 667 | 1:2 | Clear/light yellow |
| 14.5 | Na 3.3 10% + Fe 3000 ppm | 6.7 | 1000 | 2:1 | sludge |

TABLE 18-continued

Mixtures of 3.3 molar ratio Na silicate ("Na 3.3") solutions with FeCl₃ solutions

| Ex. | Formulation | SiO₂ % | Metal ppm | Ratio silicate soln. to metal soln. | Appearance |
|---|---|---|---|---|---|
| 14.6 | Na 3.3 10% + Fe 3000 ppm | 8 | 600 | 4:1 | sludge |

TABLE 19

Mixtures of 3.3 molar ratio Na silicate ("Na 3.3") solutions with SnCl₂ solutions

| Ex. | Formulation | SiO₂ % | Metal ppm | Ratio silicate soln. to metal soln. | Appearance |
|---|---|---|---|---|---|
| 15.1 | Na 3.3 10% + Sn 532 ppm | 5 | 266 | 1:1 | Gel and haze |
| 15.2 | Na 3.3 10% + Sn 532 ppm | 8 | 106 | 4:1 | Clear, colorless |
| 15.3 | Na 3.3 10% + Sn 532 ppm | 2 | 426 | 1:4 | Clear, colorless |

TABLE 20

Mixtures of 3.3 molar ratio Na silicate ("Na 3.3") solutions with FeCl₃ solutions

| Ex. | Formulation | SiO₂ % | Metal ppm | Ratio silicate soln. to metal soln. | Appearance |
|---|---|---|---|---|---|
| 16.1 | Na 3.3 10% + Fe 3000 ppm | 5 | 1500 | 4:1 | Clear/dark gray blue |
| 16.2 | Na 3.3 10% + Fe 3000 ppm | 2 | 2400 | 1:4 | Clear/colorless |
| 16.3 | Na 3.3 10% + Fe 3000 ppm | 8 | 600 | 4:1 | Clear/light gray |

Example 17

An aqueous solution containing 3000 ppm by weight of $Ag^+$ was prepared by dissolving 0.472 g $AgNO_3$ in sufficient deionized water to obtain 100 g of $Ag^+$ solution. Under vigorous stirring using a bar magnet, 2.5 g of the $Ag^+$ solution was added to 10 g of a solution of 3.3 $SiO_2$:$K_2O$ molar ratio potassium silicate containing 10% $SiO_2$, to obtain Example 17.1. The appearance of the formulation was observed at the end of the admixing.

Examples 17.2 to 17.6 were prepared following the same general procedure as used to prepare Example 17.1, but varying the concentration of either one or both of the solutions and/or the relative amounts of the solutions admixed. For each formulation the appearance was noted after admixing. Details of the formulations and the results are shown in Table 21.

TABLE 21

Mixtures of 3.3 molar ratio K silicate ("K 3.3") solutions with AgNO₃ solutions

| Ex. | Formulation | SiO₂ % | Metal ppm | Ratio silicate soln. to metal soln. | Appearance |
|---|---|---|---|---|---|
| 17.1 | K 3.3 20% + Ag 3000 ppm | 16 | 600 | 4:1 | Clear/colourless |
| 17.2 | K 3.3 20% + Ag 3000 ppm | 15 | 750 | 3:1 | Clear/colourless |
| 17.3 | K 3.3 20% + Ag 3000 ppm | 13 | 1000 | 2:1 | Clear/colourless |
| 17.4 | K 3.3 20% + Ag 3000 ppm | 10 | 1500 | 1:1 | Clear/colourless |
| 17.5 | K 3.3 10% + Ag 3000 ppm | 5 | 1500 | 1:1 | Clear/yellow |
| 17.6 | K 3.3 20% + Ag 3000 ppm | 16 | 600 | 4:1 | Clear/colourless |

Examples 18 to 21

Examples 18 and 19 (Ex. 18.1 through 19.6) were prepared following the same general procedure as in Example 17, using different metal salts and the 3.3 molar ratio potassium silicate, at varying amounts of metal and silicate. For each formulation the appearance was noted after admixing. Details of the formulations and the results are shown in Tables 22 and 23.

TABLE 22

Mixtures of 3.3 molar ratio K silicate ("K 3.3") solutions with CuSO₄ solutions

| Ex. | Formulation | SiO₂ % | Metal ppm | Ratio silicate soln. to metal soln. | Appearance |
|---|---|---|---|---|---|
| 18.1 | K 3.3 20% + Cu 3000 ppm | 16 | 600 | 4:1 | Clear/blue |
| 18.2 | K 3.3 20% + Cu 3000 ppm | 15 | 750 | 3:1 | Clear/blue* |
| 18.3 | K 3.3 20% + Cu 3000 ppm | 13 | 1000 | 2:1 | Clear/blue* |
| 18.4 | K 3.3 20% + Cu 3000 ppm | 10 | 1500 | 1:1 | Clear/blue* |
| 18.5 | K 3.3 10% + Cu 3000 ppm | 8 | 600 | 4:1 | Clear/blue* |
| 18.6 | K 3.3 10% + Cu 1000 ppm | 5 | 500 | 1:1 | Clear/blue* |
| 18.7 | K 3.3 10% + Cu 1000 ppm | 3.3 | 667 | 1:2 | Slight haze |
| 18.8 | K 3.3 10% + Cu 1000 ppm | 2 | 800 | 1:4 | Slight haze* |

*Appearance of formulation after one week

TABLE 23

Mixtures of 3.3 molar ratio K silicate ("K 3.3") solutions with FeCl₃ solutions

| Ex. | Formulation | SiO₂ % | Metal ppm | Ratio silicate soln. to metal soln. | Appearance |
|---|---|---|---|---|---|
| 19.1 | K 3.3 10% + Fe 3000 ppm | 6.7 | 1000 | 2:1 | sludge |
| 19.2 | K 3.3 10% + Fe 1000 ppm | 5 | 500 | 1:1 | Slight haze |
| 19.3 | K 3.3 10% + Fe 1000 ppm | 3.3 | 667 | 1:2 | Slight haze |
| 19.4 | K 3.3 10% + Fe 3000 ppm | 6.7 | 1000 | 2:1 | sludge |

TABLE 23-continued

Mixtures of 3.3 molar ratio K silicate ("K 3.3") solutions with FeCl₃ solutions

| Ex. | Formulation | SiO$_2$ % | Metal ppm | Ratio silicate soln. to metal soln. | Appearance |
|---|---|---|---|---|---|
| 19.5 | K 3.3 10% + Fe 1000 ppm | 5 | 500 | 1:1 | Slight haze |
| 19.6 | K 3.3 10% + Fe 1000 ppm | 3.3 | 667 | 1:2 | Slight haze |

Example 20

To 10 g of an aqueous solution of SnCl$_2$ containing 1000 ppm Sn$^{2+}$, 8.8 g of 1M HCl (aq) were added, causing the pH in the solution to drop from 2.5 to 0.73.

Under vigorous stirring using a bar magnet, 5 g of the Sn$^{2+}$ solution was added to 5 g of a solution of 3.3 SiO$_2$:K$_2$O molar ratio potassium silicate containing 10% SiO$_2$, to obtain Example 20.1. The appearance of the formulation was observed at the end of the admixing.

Examples 20.2 and 20.3 were prepared following the same general procedure as used to prepare Example 20.1, but varying the relative amounts of the solutions admixed. For each formulation the appearance was noted after admixing. Details of the formulations and the results are shown in Table 24.

TABLE 24

Mixtures of 3.3 molar ratio K silicate ("K 3.3") solutions with SnCl$_2$ solutions

| Ex. | Formulation | SiO$_2$ % | Metal ppm | Ratio silicate soln. to metal soln. | Appearance |
|---|---|---|---|---|---|
| 20.1 | K 3.3 10% + Sn 532 ppm | 5 | 266 | 1:1 | Gel and haze |
| 20.2 | K 3.3 10% + Sn 532 ppm | 8 | 106 | 4:1 | Clear, colorless |
| 20.3 | K 3.3 10% + Sn 532 ppm | 2 | 426 | 1:4 | Clear, colorless |

Example 21

To 62.5 g of an aqueous solution of FeSO$_4$ containing 9000 ppm Fe$^{2+}$, 46.9 g of 1M HCl (aq) and 78.1 g of de-ionized water were added, causing the pH in the solution to drop from 3.77 to 0.79.

Under vigorous stirring using a bar magnet, 2 g of the Fe$^{2+}$ solution was added to 8 g of a solution of 3.3 SiO$_2$:K$_2$O molar ratio potassium silicate containing 10% SiO$_2$, to obtain Example 21. The appearance of the formulation was observed at the end of the admixing. Details of the formulation and the results are shown in Table 25.

TABLE 25

Mixtures of 3.3 molar ratio K silicate ("K 3.3") solutions with FeSO$_4$ solutions

| Ex. | Formulation | SiO$_2$ % | Metal ppm | Ratio silicate soln. to metal soln. | Appearance |
|---|---|---|---|---|---|
| 21 | K 3.3 10% + Fe 3000 ppm | 8 | 600 | 4:1 | Clear/blue gray |

Example 22

An aqueous solution containing 3000 ppm by weight of Ag$^+$ was prepared by dissolving 0.472 g AgNO$_3$ in sufficient deionized water to obtain 100 g of Ag$^+$ solution. Under vigorous stirring using a bar magnet, 5 g of the Ag$^+$ solution was added to 5 g of a solution of 4.3 SiO$_2$:Na$_2$O molar ratio potassium silicate containing 15% SiO$_2$, to obtain Example 22.1. The appearance of the formulation was observed at the end of the admixing.

Examples 22.2 to 22.4 were prepared following the same general procedure as used to prepare Example 22.1, but varying the concentration of either one or both of the solutions and/or the relative amounts of the solutions admixed. For each formulation the appearance was noted after admixing. Details of the formulations and the results are shown in Table 26.

TABLE 26

Mixtures of 4.3 ratio Na silicate ("Na 4.3") solutions with AgNO$_3$ solutions

| Ex. | Formulation | SiO$_2$ % | Metal ppm | Ratio silicate soln. to metal soln. | Appearance |
|---|---|---|---|---|---|
| 22.1 | Na 4.3 15% + Ag 3000 ppm | 7.5 | 1500 | 1:1 | Slight haze |
| 22.2 | Na 4.3 10% + Ag 1000 ppm | 5 | 500 | 1:1 | Slight haze |
| 22.3 | Na 4.3 10% + Ag 1000 ppm | 8 | 200 | 4:1 | haze |
| 22.4 | Na 4.3 10% + Ag 1000 ppm | 2 | 800 | 1:4 | Clear/light yellow |

Examples 23 and 24

Examples 23 and 24 (Ex. 23.1 through 24.9) were prepared following the same general procedure as in Example 22, using different metal salts and the 4.3 molar ratio sodium silicate, at varying amounts of metal and silicate. For each formulation the appearance was noted after admixing. Details of the formulations and the results are shown in Tables 27 and 28.

TABLE 27

Mixtures of 4.3 ratio Na silicate ("Na 4.3") solutions with CuSO$_4$ solutions

| Ex. | Formulation | SiO$_2$ % | Metal ppm | Ratio silicate soln. to metal soln. | Appearance |
|---|---|---|---|---|---|
| 23.1 | Na 4.3 15% + Cu 1000 ppm | 7.5 | 500 | 1:1 | Clear/blue |
| 23.2 | Na 4.3 15% + Cu 1000 ppm | 3 | 800 | 1:4 | Slight haze |

TABLE 27-continued

Mixtures of 4.3 ratio Na silicate ("Na 4.3")
solutions with CuSO₄ solutions

| Ex. | Formulation | SiO₂ % | Metal ppm | Ratio silicate soln. to metal soln. | Appearance |
|---|---|---|---|---|---|
| 23.3 | Na 4.3 10% + Cu 1000 ppm | 5 | 500 | 1:1 | Slight haze |
| 23.4 | Na 4.3 10% + Cu 3000 ppm | 5 | 1500 | 1:1 | Gel/sludge |
| 23.5 | Na 4.3 10% + Cu 1000 ppm | 6.6 | 333 | 2:1 | Gel/sludge |

TABLE 28

Mixtures of 4.3 ratio Na silicate ("Na 4.3") solutions with ZnCl₂ solutions

| Ex. | Formulation | SiO₂ % | Metal ppm | Ratio silicate soln. to metal soln. | Appearance |
|---|---|---|---|---|---|
| 24.1 | Na 4.3 15% + Zn 3000 ppm | 7.5 | 1500 | 1:1 | Slight haze |
| 24.2 | Na 4.3 15% + Zn 3000 ppm | 10 | 1000 | 2:1 | Slight haze |
| 24.3 | Na 4.3 15% + Zn 3000 ppm | 3 | 2400 | 1:4 | Clear/Colourless |
| 24.4 | Na 4.3 10% + Zn 3000 ppm | 5 | 1500 | 1:1 | Clear/Colourless |
| 24.5 | Na 4.3 10% + Zn 3000 ppm | 5 | 1500 | 1:1 | Clear/Colourless |
| 24.6 | Na 4.3 10% + Zn 1000 ppm | 5 | 500 | 1:1 | Slight haze |
| 24.7 | Na 4.3 10% + Zn 1000 ppm | 5 | 500 | 1:1 | Clear/Colourless |
| 24.8 | Na 4.3 15% + Zn 1000 ppm | 7.5 | 500 | 1:1 | Clear/Colourless |
| 24.9 | Na 4.3 15% + Zn 1000 ppm | 3 | 800 | 1:4 | Clear/Colourless |

Example 25

An aqueous solution containing 5040 ppm by weight of Ag⁺ was prepared by dissolving 0.794 g AgNO₃ in sufficient deionized water to obtain 100 g of Ag⁺ solution. Under vigorous stirring using a bar magnet, 5 g of the Ag⁺ solution was added to 5 g of a solution of 4.3 SiO₂:K₂O molar ratio potassium silicate containing 10% SiO₂, to obtain Example 25.1. The appearance of the formulation was observed at the end of the admixing.

Examples 25.2 to 25.5 were prepared following the same general procedure as used to prepare Example 20.1, but varying the concentration of either one or both of the solutions and/or the relative amounts of the solutions admixed. For each formulation the appearance was noted after admixing. Details of the formulations and the results are shown in Table 29.

TABLE 29

Mixtures of 4.3 ratio K silicate ("K 4.3") with AgNO₃ solutions

| Ex. | Formulation | SiO₂ % | Metal ppm | Ratio silicate soln. to metal soln. | Appearance |
|---|---|---|---|---|---|
| 25.1 | K 4.3 10% + Ag 5040 ppm | 5 | 2520 | 1:1 | Clear/yellow |
| 25.2 | K 4.3 10% + Ag 3000 ppm | 3.3 | 2000 | 1:2 | Clear/yellow |

TABLE 29-continued

Mixtures of 4.3 ratio K silicate ("K 4.3") with AgNO₃ solutions

| Ex. | Formulation | SiO₂ % | Metal ppm | Ratio silicate soln. to metal soln. | Appearance |
|---|---|---|---|---|---|
| 25.3 | K 4.3 10% + Ag 3000 ppm | 6.7 | 1000 | 2:1 | Clear/light yellow |
| 25.4 | K 4.3 15% + Ag 1000 ppm | 7.5 | 500 | 1:1 | Slight haze |
| 25.5 | K 4.3 10% + Ag 1000 ppm | 5 | 500 | 1:1 | Clear/yellow |

Examples 26 and 27

Examples 26 and 27 (Ex. 26.1 through 27.3) were prepared following the same general procedure as in Example 25, using different metal salts and the 4.3 molar ratio potassium silicate, at varying amounts of metal and silicate. For each formulation the appearance was noted after admixing. Details of the formulations and the results are shown in Tables 30 and 31.

TABLE 30

Mixtures of 4.3 ratio K silicate ("K 4.3") solutions with CuSO₄ solutions

| Ex. | Formulation | SiO₂ % | Metal ppm | Ratio silicate soln. to metal soln. | Appearance |
|---|---|---|---|---|---|
| 26.1 | K 4.3 15% + Cu 3000 ppm | 7.5 | 1500 | 1:1 | Hazy/gel |
| 26.2 | K 4.3 15% + Cu 1000 ppm | 7.5 | 500 | 1:1 | Clear/blue |
| 26.3 | K 4.3 15% + Cu 1000 ppm | 3 | 800 | 1:4 | Slight haze |

TABLE 31

Mixtures of 4.3 ratio K silicate ("K 4.3") solutions with Zn(C₂H₃O₂)₂ solutions

| Ex. | Formulation | SiO₂ % | Metal ppm | Ratio silicate soln. to metal soln. | Appearance |
|---|---|---|---|---|---|
| 27.1 | K 4.3 15% + Zn 3000 ppm | 7.5 | 1500 | 1:1 | Hazy/gel |
| 27.2 | K 4.3 15% + Zn 1000 ppm | 7.5 | 500 | 1:1 | Clear/colourless |
| 27.3 | K 4.3 15% + Zn 1000 ppm | 3 | 800 | 1:4 | Clear/colourless |

Example 28

An aqueous solution containing 5040 ppm by weight of Ag⁺ was prepared by dissolving 0.794 g AgNO₃ in sufficient deionized water to obtain 100 g of Ag⁺ solution. Under vigorous stirring using a bar magnet, 5 g of the Ag⁺ solution was added to 5 g of a solution of 4.3 SiO₂:Li₂O molar ratio lithium silicate containing 15% SiO₂, to obtain Example 28.1. The appearance of the formulation was observed at the end of the admixing.

Examples 28.2 to 28.6 were prepared following the same general procedure as used to prepare Example 28.1, but varying the concentration of either one or both of the solutions and/or the relative amounts of the solutions admixed. For each formulation the appearance was noted after admixing. Details of the formulations and the results are shown in Table 32.

TABLE 32

Mixtures of 4.3 ratio Li silicate solutions with AgNO₃ solutions

| Ex. | Formulation | SiO₂ % | Metal ppm | Ratio silicate soln. to metal soln. | Appearance |
|---|---|---|---|---|---|
| 28.1 | Li 4.3 15% + Ag 5040 ppm | 7.5 | 2520 | 1:1 | Haze/dark |
| 28.2 | Li 4.3 15% + Ag 3000 ppm | 7.5 | 1500 | 1:1 | Haze/dark |
| 28.3 | Li 4.3 15% + Ag 1000 ppm | 7.5 | 500 | 1:1 | Haze/precipitate |
| 28.4 | Li 4.3 10% + Ag 1000 ppm | 5 | 500 | 1:1 | Haze/precipitate |
| 28.5 | Li 4.3 10% + Ag 1000 ppm | 6.7 | 333 | 2:1 | Haze/precipitate |
| 28.6 | Li 4.3 10% + Ag 1000 ppm | 3.3 | 666 | 1:2 | Clear/yellow |

Examples 29 and 30

Examples 29 and 30 (Ex. 29.1 through 30.3) were prepared following the same general procedure as in Example 28, using different metal salts and the 4.3 molar ratio lithium silicate, at varying amounts of metal and silicate. For each formulation the appearance was noted after admixing. Details of the formulations and the results are shown in Tables 33 and 34.

TABLE 33

Mixtures of 4.3 ratio Li silicate solutions with CuSO₄ solutions

| Ex. | Formulation | SiO₂ % | Metal ppm | Ratio silicate soln. to metal soln. | Appearance |
|---|---|---|---|---|---|
| 29.1 | Li 4.3 15% + Cu 3000 ppm | 7.5 | 1500 | 1:1 | Haze, blue. Almost clear the day after |
| 29.2 | Li 4.3 15% + Cu 1000 ppm | 7.5 | 500 | 1:1 | Clear, blue |
| 29.3 | Li 4.3 15% + Cu 1000 ppm | 3 | 800 | 1:4 | Clear, blue |

TABLE 34

Mixtures of 4.3 ratio Li silicate solutions with Zn(C₂H₃O₂)₂ solutions

| Ex. | Formulation | SiO₂ % | Metal ppm | Ratio silicate soln. to metal soln. | Appearance |
|---|---|---|---|---|---|
| 30.1 | Li 4.3 15% + Zn 3000 ppm | 7.5 | 1500 | 1:1 | Haze, gel |
| 30.2 | Li 4.3 15% + Zn 1000 ppm | 7.5 | 500 | 1:1 | Clear, colorless |
| 30.3 | Li 4.3 15% + Zn 1000 ppm | 3 | 800 | 1:4 | Clear, colorless |

Example 31

An aqueous solution containing 5040 ppm by weight of Ag⁺ was prepared by dissolving 0.794 g AgNO₃ in sufficient deionized water to obtain 100 g of Ag⁺ solution. Under vigorous stirring using a bar magnet, 5 g of the Ag⁺ solution was added to 5 g of a solution of 2.5 SiO₂:Na₂O molar ratio sodium silicate containing 10% SiO₂, to obtain Example 31.1. The appearance of the formulation was observed at the end of the admixing.

Examples 31.2 to 31.5 were prepared following the same general procedure as used to prepare Example 31.1, but varying the concentration of either one or both of the solutions and/or the relative amounts of the solutions admixed. For each formulation the appearance was noted after admixing. Details of the formulations and the results are shown in Table 35.

TABLE 35

Mixtures of 2.5 ratio Na silicate ("Na 2.5") solutions with AgNO₃ solutions

| Ex. | Formulation | SiO₂ % | Metal ppm | Ratio silicate soln. to metal soln. | Appearance |
|---|---|---|---|---|---|
| 31.1 | Na 2.5 10% + Ag 5040 ppm | 5 | 2520 | 1:1 | Sediment/yellow |
| 31.2 | Na 2.5 10% + Ag 3000 ppm | 5 | 1500 | 1:1 | Sediment/yellow |
| 31.3 | Na 2.5 10% + Ag 1000 ppm | 6.7 | 333 | 2:1 | Precipitation/light yellow |
| 31.4 | Na 2.5 10% + Ag 1000 ppm | 3.3 | 667 | 1:2 | Precipitation/light brown |
| 31.5 | Na 2.5 10% + Ag 1000 ppm | 8 | 200 | 4:1 | Clear/colourless |

Examples 32 and 33

Examples 32 and 33 (Ex. 32.1 through 33.4) were prepared following the same general procedure as in Example 31, using different metal salts and the 2.5 molar ratio sodium silicate, at varying amounts of metal and silicate. For each formulation the appearance was noted after admixing. Details of the formulations and the results are shown in Tables 36 and 37.

TABLE 36

Mixtures of 2.5 ratio Na silicate ("Na 2.5") solutions with CuSO₄ solutions

| Ex. | Formulation | SiO₂ % | Metal ppm | Ratio silicate soln. to metal soln. | Appearance |
|---|---|---|---|---|---|
| 32.1 | Na 2.5 10% + Cu 3000 ppm | 5 | 1500 | 1:1 | Clear/blue |

TABLE 37

Mixtures 2.5 ratio Na silicate ("Na 2.5") solutions with Zn(C₂H₃O₂)₂ solutions

| Ex. | Formulation | SiO₂ % | Metal ppm | Ratio silicate soln. to metal soln. | Appearance |
|---|---|---|---|---|---|
| 33.1 | Na 2.5 10% + Zn 3000 ppm | 5 | 1500 | 1:1 | Slight haze |
| 33.2 | Na 2.5 10% + Zn 1000 ppm | 5 | 500 | 1:1 | Clear/colourless |
| 33.3 | Na 2.5 5% + Zn 500 ppm | 2.5 | 250 | 1:1 | Clear/colourless |
| 33.4 | Na 2.5 10% + Zn 3000 ppm | 5 | 1500 | 1:1 | Slight haze |

Example 34

An aqueous solution containing 1000 ppm by weight of $Ag^+$ was prepared by dissolving 0.157 g $AgNO_3$ in sufficient deionized water to obtain 100 g of solution.

Separately, 10 g of a solution of 3.3 $SiO_2$:$Li_2O$ molar ratio lithium silicate containing 10% $SiO_2$ were mixed with 10 g of a solution of 3.3 $SiO_2$:$K_2O$ molar ratio potassium silicate containing 10% $SiO_2$. To 5 g of the obtained mixed alkali silicate solution, 5 g of the silver containing solution were added, dropwise and under stirring, to obtain Example 34.1. After completion of the addition, the appearance of the formulation was noted.

Examples 34.2 and 34.3 were prepared following the same general procedure as used to prepare Example 34.1, but varying the alkali silicate solutions used. For each formulation, the appearance was noted after admixing. Details of the formulations and the results are shown in Table 38.

TABLE 38

Mixtures of blends of alkali silicate solutions with $AgNO_3$ solutions

| Ex. | Formulation | $SiO_2$ % | Metal ppm | Ratio of silicate to metal solution | Appearance |
|---|---|---|---|---|---|
| 34.1 | K 3.3 + Li 3.3 + Ag 1000 ppm | 5 | 500 | 1:1 | Clear/light yellow |
| 34.2 | Na 3.3 + Li 3.3 + Ag 1000 ppm | 5 | 500 | 1:1 | Clear/light yellow, slight haze |
| 34.3 | Na 2.5 + Li 3.3 + Ag 1000 ppm | 5 | 500 | 1:1 | Clear/light yellow, slight haze |

Examples 35 and 36

Examples 35 and 36 (Ex. 35.1 through 36.3) were prepared following the same general procedure as used in Example 34, but using other metal salts and the 2.5. For each formulation, the appearance was noted after admixing. Details of the formulations and the results are shown in Tables 39 and 40.

TABLE 39

Mixtures of blends of alkali silicate solutions with $CuSO_4$ solutions

| Ex. | Formulation | $SiO_2$ % | Metal ppm | Ratio silicate soln. to metal soln. | Appearance |
|---|---|---|---|---|---|
| 35.1 | K 3.3 + Li 3.3 + Cu 1000 ppm | 5 | 500 | 1:1 | Clear/blue |
| 35.2 | Na 3.3 + Li 3.3 + Cu 1000 ppm | 5 | 500 | 1:1 | Clear/blue |
| 35.3 | Na 2.5 + Li 3.3 + Cu 1000 ppm | 5 | 500 | 1:1 | Clear/blue |

TABLE 40

Mixtures of blends of alkali silicate solutions with $Zn(C_2H_3O_2)_2$ solutions

| Ex. | Formulation | $SiO_2$ % | Metal ppm | Ratio silicate soln. to metal soln. | Appearance |
|---|---|---|---|---|---|
| 36.1 | K 3.3 + Li 3.3 + Zn 1000 ppm | 5 | 500 | 1:1 | Clear, some preciptiation |
| 36.2 | Na 3.3 + Li 3.3 + Zn 1000 ppm | 5 | 500 | 1:1 | Clear/colourless |
| 36.3 | Na 2.5 + Li 3.3 + Zn 1000 ppm | 5 | 500 | 1:1 | Clear/colourless |

Example 37

Examples 3.5 and 9.2 were repeated, but to the solutions were also added a small amount of a non-ionic surfactant, viz. Empilan® PF 7179 at an amount of 0.2% by weight of the final solution, to give the solutions of Examples 37.1 and 37.2, respectively. The mixtures were observed directly after admixing. Details of the formulations and the results are shown in Table 41.

TABLE 41

Mixtures containing 0.2% of the non-ionic surfactant Empilan ® PF 7169

| Ex. | Formulation | $SiO_2$ % | Metal ppm | Ratio silicate soln. to metal soln. | Appearance |
|---|---|---|---|---|---|
| 37.1 | Li 3.3 10% + Cu 3000 ppm | 8 | 600 | 4:1 | Clear, blue |
| 37.2 | Li 3.3 10% + Zn 3000 ppm | 5 | 1500 | 1:1 | Clear, colourless |

The invention claimed is:

1. An aqueous alkali silicate solution containing ions of one or more metals, wherein said one or more metals are selected from Cr, Gd, Zn, Co, Mn, Pb, Sn, Cu, and Ag, and wherein said ions are present at a total concentration of from 50 ppm to 5000 ppm by weight of the aqueous alkali silicate solution, wherein the aqueous alkali silicate solution contains alkali metal oxide $M_2O$ and $SiO_2$ at a $SiO_2/M_2O$ molar ratio of from 25:1 to 2:1, and wherein the aqueous alkali silicate solution is free from any complexing agent for the ions or contains one or more complexing agents for the ions in a total molar ratio of the one or more complexing agents to the ions of lower than 1:100.

2. The aqueous alkali silicate solution according to claim 1, wherein said ions are present at a total concentration of from 100 ppm to 5000 ppm by weight of the aqueous alkali silicate solution.

3. The aqueous alkali silicate solution according to claim 1, wherein said ions are present at a total concentration of from 50 ppm to 3000 ppm by weight of the aqueous alkali silicate solution.

4. The aqueous alkali silicate solution according to claim 1, wherein said ions are present at a total concentration of from 100 ppm to 2000 ppm by weight of the aqueous alkali silicate solution.

5. The aqueous alkali silicate solution according to claim 1, having a pH of from 8 to 13.

6. The aqueous alkali silicate solution according to claim 1, having a pH of from 10 to 12.

7. The aqueous alkali silicate solution according to claim 1, wherein the $SiO_2/M_2O$ molar ratio is from 6:1 to 2:1.

8. The aqueous alkali silicate solution according to claim 1, wherein a silicate is present in the aqueous alkali silicate solution in an amount corresponding to a concentration of $SiO_2$ in the aqueous alkali silicate solution of from 1% to 30% by weight of the aqueous alkali silicate solution.

9. The aqueous alkali silicate solution according to claim 8, wherein the amount corresponds to a concentration of $SiO_2$ in the aqueous alkali silicate solution of from 2% to 20% by weight of the aqueous alkali silicate solution.

10. The aqueous alkali silicate solution according to claim 1, wherein the one or more metals are transition metals.

11. The aqueous alkali silicate solution according to claim 1, wherein said one or more metals are selected from Cr, Gd, Zn, Co, Mn, Sn, Cu, and Ag.

12. The aqueous alkali silicate solution according to claim 1, comprising one or more surfactants.

13. The aqueous alkali silicate solution of claim 1, wherein the ions of the one or more metals are ions of one or more metals selected from Cr, Gd, Zn, Co, Mn, Sn, Cu, and Ag, and wherein the ions of the one or more metals are present at a total concentration of from 50 ppm to 3000 ppm by weight of the aqueous alkali silicate solution.

14. The aqueous alkali silicate solution of claim 13, having a pH of from 8 to 13.

15. The aqueous alkali silicate solution of claim 13, wherein said solution is free from any complexing agent for said ions.

16. The aqueous alkali silicate solution of claim 1, wherein said one or more metals are selected from Cr, Gd, Co, Mn, Sn, Cu, and Ag.

\* \* \* \* \*